US012688312B2

(12) United States Patent
Thummala et al.

(10) Patent No.: US 12,688,312 B2
(45) Date of Patent: Jul. 21, 2026

(54) CONSISTENT ACCESS CONTROL LISTS ACROSS FILE SERVERS FOR LOCAL USERS IN A DISTRIBUTED FILE SERVER ENVIRONMENT

(71) Applicant: Nutanix, Inc., San Jose, CA (US)

(72) Inventors: Hemantha Kumar Thummala, San Jose, CA (US); Manoj Premanand Naik, San Jose, CA (US); Saji Kumar Vijaya Kumari Rajendran Nair, San Jose, CA (US); Srikrishan Malik, Pune (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/959,418

(22) Filed: Nov. 25, 2024

(65) Prior Publication Data

US 2025/0086295 A1    Mar. 13, 2025

Related U.S. Application Data

(62) Division of application No. 17/648,735, filed on Jan. 24, 2022, now Pat. No. 12,153,690.

(51) Int. Cl.
| | |
|---|---|
| *G06F 21/60* | (2013.01) |
| *G06F 16/188* | (2019.01) |
| *G06F 21/62* | (2013.01) |

(52) U.S. Cl.
CPC .......... *G06F 21/604* (2013.01); *G06F 16/188* (2019.01); *G06F 21/602* (2013.01); *G06F 21/6218* (2013.01); *G06F 2221/2141* (2013.01)

(58) Field of Classification Search
CPC .... G06F 21/604; G06F 16/188; G06F 21/602; G06F 21/6218; G06F 2221/2141
(Continued)

(56) References Cited

U.S. PATENT DOCUMENTS

| | | | |
|---|---|---|---|
| 5,276,867 | A | 1/1994 | Kenley et al. |
| 5,664,144 | A | 9/1997 | Yanai et al. |

(Continued)

FOREIGN PATENT DOCUMENTS

| | | |
|---|---|---|
| CN | 103746997 A | 4/2014 |
| CN | 105100210 A | 11/2015 |

(Continued)

OTHER PUBLICATIONS

US 11,048,595 B2, 06/2021, Venkatesh et al. (withdrawn)

(Continued)

*Primary Examiner* — Jacob Lipman
(74) *Attorney, Agent, or Firm* — Stoel Rives LLP

(57) ABSTRACT

Examples described herein are generally directed towards file server access controls, and more specifically towards a mechanism to create consistent access control lists for local users across different file servers in a distributed file server environment. In operation, a local user system SID (e.g., external SID) may be generated for a first user of a first file server. A global ID based on attributes associated with the user of the first file server may also be generated. The global ID for the user may be stored in metadata associated with an access control list (ACL) for a file accessible through the first file server. Data, including the file may be migrated to a second file server. Based on receiving an access request at the second file server associated with the user based on the external ID, the external ID for the user may be translated into the global ID, and used to determine access to the file.

31 Claims, 10 Drawing Sheets

Flow of ACL Update

(58) Field of Classification Search
USPC .......................................................... 726/26
See application file for complete search history.

(56) References Cited

U.S. PATENT DOCUMENTS

| | | | |
|---|---|---|---|
| 5,870,555 A | 2/1999 | Pruett et al. | |
| 5,873,085 A | 2/1999 | Enoki et al. | |
| 5,924,096 A | 7/1999 | Draper et al. | |
| 6,044,367 A | 3/2000 | Wolff | |
| 6,055,543 A | 4/2000 | Christensen et al. | |
| 6,085,234 A | 7/2000 | Pitts et al. | |
| 6,101,508 A | 8/2000 | Wolff | |
| 6,212,531 B1 | 4/2001 | Blea et al. | |
| 6,289,356 B1 | 9/2001 | Hitz et al. | |
| 6,341,340 B1 | 1/2002 | Tsukerman et al. | |
| 6,442,602 B1 | 8/2002 | Choudhry | |
| 6,539,381 B1 | 3/2003 | Prasad et al. | |
| 6,963,914 B1 | 11/2005 | Breitbart et al. | |
| 6,968,345 B1 | 11/2005 | Muhlestein | |
| 7,120,631 B1 | 10/2006 | Vahalia et al. | |
| 7,159,056 B2 | 1/2007 | Goldick | |
| 7,162,467 B2 | 1/2007 | Eshleman et al. | |
| 7,356,679 B1 | 4/2008 | Le et al. | |
| 7,366,738 B2 | 4/2008 | Yorke et al. | |
| 7,409,511 B2 | 8/2008 | Edwards et al. | |
| 7,606,868 B1 | 10/2009 | Le et al. | |
| 7,702,843 B1 | 4/2010 | Chen et al. | |
| 7,707,618 B1 | 4/2010 | Cox et al. | |
| 7,725,671 B2 | 5/2010 | Prahlad et al. | |
| 7,752,492 B1 | 7/2010 | Armangau et al. | |
| 7,774,391 B1 | 8/2010 | Le et al. | |
| 7,805,469 B1 | 9/2010 | Nagaralu et al. | |
| 7,805,511 B1 | 9/2010 | Panicker et al. | |
| 7,840,533 B2 | 11/2010 | Prahlad et al. | |
| 7,890,529 B1 | 2/2011 | Srinivasan et al. | |
| 7,937,453 B1 | 5/2011 | Hayden et al. | |
| 8,095,810 B2 | 1/2012 | Matsuzawa et al. | |
| 8,095,931 B1 | 1/2012 | Chen et al. | |
| 8,112,661 B1 | 2/2012 | La France et al. | |
| 8,352,482 B2 | 1/2013 | Hansen | |
| 8,352,608 B1 | 1/2013 | Keagy et al. | |
| 8,359,594 B1 | 1/2013 | Davidson et al. | |
| 8,365,167 B2 | 1/2013 | Beaty et al. | |
| 8,407,448 B1 | 3/2013 | Hayden et al. | |
| 8,447,728 B2 | 5/2013 | Prahlad et al. | |
| 8,473,462 B1 | 6/2013 | Banerjee | |
| 8,484,163 B1 | 7/2013 | Yucel et al. | |
| 8,484,356 B1 | 7/2013 | Douglis et al. | |
| 8,539,076 B2 | 9/2013 | Nakano et al. | |
| 8,543,790 B2 | 9/2013 | Chen et al. | |
| 8,549,518 B1 | 10/2013 | Aron et al. | |
| 8,601,473 B1 | 12/2013 | Aron et al. | |
| 8,635,351 B2 | 1/2014 | Astete et al. | |
| 8,646,089 B2 | 2/2014 | Jayanthi et al. | |
| 8,688,660 B1 | 4/2014 | Sivasubramanian et al. | |
| 8,700,573 B2 | 4/2014 | Enko et al. | |
| 8,719,522 B1 | 5/2014 | Chait et al. | |
| 8,725,679 B2 | 5/2014 | Nair et al. | |
| 8,751,515 B1 | 6/2014 | Xing et al. | |
| 8,762,335 B2 | 6/2014 | Prahlad et al. | |
| 8,805,951 B1 | 8/2014 | Faibish et al. | |
| 8,838,923 B2 | 9/2014 | Prahlad et al. | |
| 8,850,130 B1 | 9/2014 | Aron et al. | |
| 8,863,124 B1 | 10/2014 | Aron | |
| 8,909,753 B2 | 12/2014 | Nakamura et al. | |
| 8,914,429 B2 | 12/2014 | Pitts | |
| 8,935,563 B1 | 1/2015 | Rajaa et al. | |
| 8,949,557 B2 | 2/2015 | Kamei et al. | |
| 8,966,188 B1 | 2/2015 | Bardale | |
| 8,983,952 B1 | 3/2015 | Zhang et al. | |
| 8,996,783 B2 | 3/2015 | Huang et al. | |
| 9,009,106 B1 | 4/2015 | Aron et al. | |
| 9,043,567 B1 | 5/2015 | Modukuri et al. | |
| 9,060,014 B2 | 6/2015 | Crowley | |
| 9,069,708 B2 | 6/2015 | Gill et al. | |
| 9,152,628 B1 | 10/2015 | Stacey et al. | |
| 9,154,535 B1 | 10/2015 | Harris | |
| 9,165,003 B1 | 10/2015 | Tummala et al. | |
| 9,201,698 B2 | 12/2015 | Ashok et al. | |
| 9,201,704 B2 | 12/2015 | Chang et al. | |
| 9,201,887 B1 | 12/2015 | Earl et al. | |
| 9,208,210 B2 | 12/2015 | Erofeev | |
| 9,213,513 B2 | 12/2015 | Hartz et al. | |
| 9,244,674 B2 | 1/2016 | Waterman et al. | |
| 9,244,969 B1 | 1/2016 | Love et al. | |
| 9,256,475 B1 | 2/2016 | Aron et al. | |
| 9,256,612 B1 | 2/2016 | Bhatt et al. | |
| 9,268,586 B2 | 2/2016 | Voccio et al. | |
| 9,274,817 B1 | 3/2016 | Fan et al. | |
| 9,286,298 B1 | 3/2016 | Gillett | |
| 9,292,327 B1 | 3/2016 | Von Thenen et al. | |
| 9,336,132 B1 | 5/2016 | Aron et al. | |
| 9,348,702 B2 | 5/2016 | Hsu et al. | |
| 9,405,566 B2 | 8/2016 | Chawla et al. | |
| 9,411,628 B2 | 8/2016 | Bezbaruah et al. | |
| 9,448,887 B1 | 9/2016 | Dayan et al. | |
| 9,495,478 B2 | 11/2016 | Hendrickson et al. | |
| 9,497,257 B1 | 11/2016 | Love et al. | |
| 9,513,946 B2 | 12/2016 | Sevigny et al. | |
| 9,519,596 B2 | 12/2016 | Coppola et al. | |
| 9,535,907 B1 | 1/2017 | Stringham | |
| 9,563,555 B2 | 2/2017 | Flynn et al. | |
| 9,571,561 B2 | 2/2017 | Jang | |
| 9,619,257 B1 | 4/2017 | Aron et al. | |
| 9,634,990 B2 | 4/2017 | Lee | |
| 9,639,428 B1 | 5/2017 | Boda et al. | |
| 9,652,265 B1 | 5/2017 | Narayanasamy et al. | |
| 9,658,899 B2 | 5/2017 | Jenkins | |
| 9,690,670 B1 | 6/2017 | Paulzagade et al. | |
| 9,733,958 B2 | 8/2017 | Cui et al. | |
| 9,740,436 B2 | 8/2017 | Fiebrich-Kandler et al. | |
| 9,740,472 B1 | 8/2017 | Sohi et al. | |
| 9,740,723 B2 | 8/2017 | Prahlad et al. | |
| 9,747,287 B1 | 8/2017 | Bhardwaj et al. | |
| 9,772,866 B1 | 9/2017 | Aron et al. | |
| 9,832,136 B1 | 11/2017 | Gibson | |
| 9,846,706 B1 | 12/2017 | Basov et al. | |
| 9,853,978 B2 | 12/2017 | Tellvik et al. | |
| 9,870,291 B2 | 1/2018 | Bezbaruah et al. | |
| 9,886,215 B1 | 2/2018 | Ramachandran et al. | |
| 9,893,988 B2 | 2/2018 | Agarwal et al. | |
| 9,940,154 B2 | 4/2018 | Ramani et al. | |
| 9,946,573 B2 | 4/2018 | Mcdermott | |
| 9,952,782 B1 | 4/2018 | Chandrasekaran et al. | |
| 10,009,215 B1 | 6/2018 | Shorey | |
| 10,050,862 B2 | 8/2018 | Nambiar et al. | |
| 10,083,022 B2 | 9/2018 | Fukui et al. | |
| 10,084,873 B2 | 9/2018 | Dornemann | |
| 10,095,506 B2 | 10/2018 | Venkatesh et al. | |
| 10,101,989 B2 | 10/2018 | Sinha et al. | |
| 10,114,706 B1 | 10/2018 | Chougala et al. | |
| 10,127,059 B2 | 11/2018 | Astete et al. | |
| 10,140,115 B2 | 11/2018 | Fukui et al. | |
| 10,152,233 B2 | 12/2018 | Xu et al. | |
| 10,210,048 B2 | 2/2019 | Sancheti | |
| 10,248,657 B2 | 4/2019 | Prahlad et al. | |
| 10,310,953 B2 | 6/2019 | Vijayan et al. | |
| 10,311,153 B2 | 6/2019 | Mason, Jr. et al. | |
| 10,367,753 B2 | 7/2019 | Schultze et al. | |
| 10,394,547 B2 | 8/2019 | Fukui et al. | |
| 10,419,426 B2 | 9/2019 | Bakshan et al. | |
| 10,484,894 B2 | 11/2019 | Gonzalez et al. | |
| 10,523,592 B2 | 12/2019 | Byers et al. | |
| 10,530,742 B2 | 1/2020 | Shah et al. | |
| 10,540,164 B2 | 1/2020 | Bafna et al. | |
| 10,540,165 B2 | 1/2020 | Bafna et al. | |
| 10,540,166 B2 | 1/2020 | Arikatla et al. | |
| 10,541,064 B2 | 1/2020 | Lee et al. | |
| 10,594,730 B1 | 3/2020 | Summers et al. | |
| 10,719,305 B2 | 7/2020 | Sinha et al. | |
| 10,719,306 B2 | 7/2020 | Deshmukh et al. | |
| 10,719,307 B2 | 7/2020 | Kanada et al. | |
| 10,728,090 B2 | 7/2020 | Deshmukh et al. | |
| 10,809,998 B2 | 10/2020 | Venkatesh et al. | |

(56) References Cited

U.S. PATENT DOCUMENTS

| | | | |
|---|---|---|---|
| 10,824,455 | B2 | 11/2020 | Arikatla et al. |
| 10,831,465 | B2 | 11/2020 | Sharpe et al. |
| 10,838,708 | B2 | 11/2020 | Sinha et al. |
| 10,949,192 | B2 | 3/2021 | Venkatesh et al. |
| 11,025,626 | B1 | 6/2021 | Todd et al. |
| 11,086,826 | B2 | 8/2021 | Thummala et al. |
| 11,106,447 | B2 | 8/2021 | Gupta et al. |
| 11,281,484 | B2 | 3/2022 | Bafna et al. |
| 11,288,239 | B2 | 3/2022 | Bafna |
| 11,294,777 | B2 | 4/2022 | Venkatesh et al. |
| 11,347,601 | B1 | 5/2022 | Nachiappan et al. |
| 12,117,972 | B2 | 10/2024 | Gopalapura Venkatesh et al. |
| 12,153,690 | B2 | 11/2024 | Thummala et al. |
| 12,164,383 | B2 | 12/2024 | Rathi et al. |
| 12,189,499 | B2 | 1/2025 | Wang et al. |
| 2001/0047400 | A1 | 11/2001 | Coates et al. |
| 2002/0069196 | A1 | 6/2002 | Betros et al. |
| 2002/0120763 | A1 | 8/2002 | Miloushev et al. |
| 2003/0014442 | A1 | 1/2003 | Shiigi et al. |
| 2003/0018784 | A1 | 1/2003 | Lette et al. |
| 2003/0115218 | A1 | 6/2003 | Bobbitt et al. |
| 2003/0163597 | A1 | 8/2003 | Hellman et al. |
| 2003/0195942 | A1 | 10/2003 | Muhlestein et al. |
| 2004/0054777 | A1 | 3/2004 | Ackaouy et al. |
| 2004/0199734 | A1 | 10/2004 | Rajamani et al. |
| 2004/0210591 | A1 | 10/2004 | Hirschfeld et al. |
| 2004/0225742 | A1 | 11/2004 | Loaiza et al. |
| 2004/0267832 | A1 | 12/2004 | Wong et al. |
| 2005/0120160 | A1 | 6/2005 | Plouffe et al. |
| 2005/0120180 | A1 | 6/2005 | Schornbach et al. |
| 2005/0125503 | A1 | 6/2005 | Iyengar et al. |
| 2005/0193221 | A1 | 9/2005 | Yoneyama |
| 2005/0193245 | A1 | 9/2005 | Hayden et al. |
| 2005/0226059 | A1 | 10/2005 | Kavuri et al. |
| 2005/0228798 | A1 | 10/2005 | Shepard et al. |
| 2006/0010227 | A1 | 1/2006 | Atluri |
| 2006/0047685 | A1 | 3/2006 | Dearing et al. |
| 2006/0080445 | A1 | 4/2006 | Chang et al. |
| 2006/0167921 | A1 | 7/2006 | Grebus et al. |
| 2006/0206901 | A1 | 9/2006 | Chan |
| 2006/0224918 | A1 | 10/2006 | Koike |
| 2006/0225065 | A1 | 10/2006 | Chandhok et al. |
| 2006/0271510 | A1 | 11/2006 | Harward et al. |
| 2006/0271931 | A1 | 11/2006 | Harris et al. |
| 2007/0022129 | A1 | 1/2007 | Bahar et al. |
| 2007/0038913 | A1 | 2/2007 | Allen et al. |
| 2007/0100905 | A1 | 5/2007 | Masters et al. |
| 2007/0101437 | A1* | 5/2007 | Yamamoto ............. G06F 16/93 |
| | | | 707/999.009 |
| 2007/0171921 | A1 | 7/2007 | Wookey et al. |
| 2007/0179991 | A1 | 8/2007 | Burnett et al. |
| 2007/0179995 | A1 | 8/2007 | Prahlad et al. |
| 2007/0300220 | A1 | 12/2007 | Seliger et al. |
| 2008/0040483 | A1 | 2/2008 | Nakatani et al. |
| 2008/0071997 | A1 | 3/2008 | Loaiza et al. |
| 2008/0098194 | A1 | 4/2008 | Hashimoto et al. |
| 2008/0104349 | A1 | 5/2008 | Maruyama et al. |
| 2008/0104589 | A1 | 5/2008 | Mccrory et al. |
| 2008/0114854 | A1 | 5/2008 | Wong et al. |
| 2008/0133486 | A1 | 6/2008 | Fitzgerald et al. |
| 2008/0134178 | A1 | 6/2008 | Fitzgerald et al. |
| 2008/0189468 | A1 | 8/2008 | Schmidt et al. |
| 2008/0201414 | A1 | 8/2008 | Amir et al. |
| 2008/0201457 | A1 | 8/2008 | London |
| 2008/0229142 | A1 | 9/2008 | Anand et al. |
| 2008/0263113 | A1 | 10/2008 | Krishnaiyer et al. |
| 2008/0270677 | A1 | 10/2008 | Kolakowski |
| 2008/0320499 | A1 | 12/2008 | Suit |
| 2008/0320583 | A1 | 12/2008 | Sharma et al. |
| 2009/0006801 | A1 | 1/2009 | Shultz et al. |
| 2009/0100248 | A1 | 4/2009 | Kami |
| 2009/0150885 | A1 | 6/2009 | Safari et al. |
| 2009/0158082 | A1 | 6/2009 | Jain et al. |
| 2009/0171971 | A1 | 7/2009 | Goddard et al. |
| 2009/0193272 | A1 | 7/2009 | Matsuzawa et al. |
| 2009/0216975 | A1 | 8/2009 | Halperin et al. |
| 2009/0248870 | A1 | 10/2009 | Kamei et al. |
| 2009/0249470 | A1 | 10/2009 | Litvin et al. |
| 2009/0254572 | A1 | 10/2009 | Redlich et al. |
| 2009/0271412 | A1 | 10/2009 | Lacapra et al. |
| 2009/0287887 | A1 | 11/2009 | Matsuki et al. |
| 2009/0288084 | A1 | 11/2009 | Astete et al. |
| 2010/0023521 | A1 | 1/2010 | Arcese et al. |
| 2010/0070725 | A1 | 3/2010 | Prahlad et al. |
| 2010/0082716 | A1 | 4/2010 | Agetsuma et al. |
| 2010/0082774 | A1 | 4/2010 | Pitts |
| 2010/0095289 | A1 | 4/2010 | Nguyen et al. |
| 2010/0138921 | A1 | 6/2010 | Na et al. |
| 2010/0174745 | A1 | 7/2010 | Ryan et al. |
| 2010/0214908 | A1 | 8/2010 | Ralev |
| 2010/0241785 | A1 | 9/2010 | Chen et al. |
| 2010/0250824 | A1 | 9/2010 | Belay |
| 2010/0275205 | A1 | 10/2010 | Nakajima |
| 2011/0022694 | A1 | 1/2011 | Dalal et al. |
| 2011/0022695 | A1 | 1/2011 | Dalal et al. |
| 2011/0022812 | A1 | 1/2011 | Van et al. |
| 2011/0022883 | A1 | 1/2011 | Hansen |
| 2011/0047340 | A1 | 2/2011 | Olson et al. |
| 2011/0078318 | A1 | 3/2011 | Desai et al. |
| 2011/0119668 | A1 | 5/2011 | Calder et al. |
| 2011/0119763 | A1 | 5/2011 | Wade et al. |
| 2011/0125835 | A1 | 5/2011 | Soltis |
| 2011/0137879 | A1 | 6/2011 | Dubey et al. |
| 2011/0161299 | A1 | 6/2011 | Prahlad et al. |
| 2011/0179414 | A1 | 7/2011 | Goggin et al. |
| 2011/0184993 | A1 | 7/2011 | Chawla et al. |
| 2011/0185292 | A1 | 7/2011 | Chawla et al. |
| 2011/0225574 | A1 | 9/2011 | Khalidi et al. |
| 2011/0239213 | A1 | 9/2011 | Aswani et al. |
| 2011/0251992 | A1 | 10/2011 | Bethlehem et al. |
| 2011/0252208 | A1 | 10/2011 | Ali et al. |
| 2011/0255538 | A1 | 10/2011 | Srinivasan et al. |
| 2011/0265076 | A1 | 10/2011 | Thorat et al. |
| 2011/0271279 | A1 | 11/2011 | Pate |
| 2011/0276578 | A1 | 11/2011 | Allalouf et al. |
| 2011/0276963 | A1 | 11/2011 | Wu et al. |
| 2011/0283277 | A1 | 11/2011 | Castillo et al. |
| 2011/0289561 | A1 | 11/2011 | Ivanov et al. |
| 2011/0307729 | A1 | 12/2011 | Matsuzawa et al. |
| 2011/0320690 | A1 | 12/2011 | Petersen et al. |
| 2012/0017114 | A1 | 1/2012 | Timashev et al. |
| 2012/0023495 | A1 | 1/2012 | Machida |
| 2012/0030456 | A1 | 2/2012 | Wu et al. |
| 2012/0054736 | A1 | 3/2012 | Arcese et al. |
| 2012/0081395 | A1 | 4/2012 | Adi et al. |
| 2012/0084381 | A1 | 4/2012 | Alladi et al. |
| 2012/0166866 | A1 | 6/2012 | Rao et al. |
| 2012/0209832 | A1 | 8/2012 | Bronner et al. |
| 2012/0233463 | A1 | 9/2012 | Holt et al. |
| 2012/0254445 | A1 | 10/2012 | Kawamoto et al. |
| 2012/0254567 | A1 | 10/2012 | Umbehocker |
| 2012/0266162 | A1 | 10/2012 | Baron |
| 2012/0272237 | A1 | 10/2012 | Baron |
| 2012/0290630 | A1 | 11/2012 | Aizman et al. |
| 2012/0304247 | A1 | 11/2012 | Badger et al. |
| 2012/0310881 | A1 | 12/2012 | Shadmon |
| 2012/0310892 | A1 | 12/2012 | Dam et al. |
| 2012/0324183 | A1 | 12/2012 | Chiruvolu et al. |
| 2013/0046740 | A1 | 2/2013 | Li et al. |
| 2013/0047160 | A1 | 2/2013 | Conover |
| 2013/0055018 | A1 | 2/2013 | Joshi et al. |
| 2013/0061110 | A1 | 3/2013 | Zvibel |
| 2013/0061167 | A1 | 3/2013 | Rhodes et al. |
| 2013/0066930 | A1 | 3/2013 | Kamei et al. |
| 2013/0117744 | A1 | 5/2013 | Klein et al. |
| 2013/0132674 | A1 | 5/2013 | Sundrani |
| 2013/0144921 | A1 | 6/2013 | Nakamura et al. |
| 2013/0151888 | A1 | 6/2013 | Bhattiprolu et al. |
| 2013/0152085 | A1 | 6/2013 | D'Amore et al. |
| 2013/0185716 | A1 | 7/2013 | Yin et al. |
| 2013/0198738 | A1 | 8/2013 | Reddin et al. |
| 2013/0212345 | A1 | 8/2013 | Nakajima |
| 2013/0227379 | A1 | 8/2013 | Gupta et al. |
| 2013/0227552 | A1 | 8/2013 | Reddin et al. |

(56) References Cited

U.S. PATENT DOCUMENTS

| | | |
|---|---|---|
| 2013/0227566 A1 | 8/2013 | Higuchi et al. |
| 2013/0232491 A1 | 9/2013 | Radhakrishnan et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2013/0318229 A1 | 11/2013 | Bakre et al. |
| 2014/0006708 A1 | 1/2014 | Huynh et al. |
| 2014/0013398 A1* | 1/2014 | Hotti .................. G06F 21/6218 726/4 |
| 2014/0025796 A1 | 1/2014 | Vibhor et al. |
| 2014/0059392 A1 | 2/2014 | Ren et al. |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0108587 A1 | 4/2014 | Goldberg et al. |
| 2014/0115182 A1 | 4/2014 | Sabaa et al. |
| 2014/0122547 A1 | 5/2014 | Agetsuma et al. |
| 2014/0123138 A1 | 5/2014 | Lee et al. |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0173199 A1 | 6/2014 | Gupta et al. |
| 2014/0181116 A1 | 6/2014 | Wang |
| 2014/0188808 A1 | 7/2014 | Wolf et al. |
| 2014/0189429 A1 | 7/2014 | Gill et al. |
| 2014/0189677 A1 | 7/2014 | Curzi et al. |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0298185 A1 | 10/2014 | Chen et al. |
| 2014/0310710 A1 | 10/2014 | Lubsey et al. |
| 2014/0359612 A1 | 12/2014 | D'Amato et al. |
| 2014/0365811 A1 | 12/2014 | Veiga et al. |
| 2015/0006707 A1 | 1/2015 | Malik et al. |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039735 A1 | 2/2015 | Zeyliger et al. |
| 2015/0039837 A1 | 2/2015 | Quan et al. |
| 2015/0081644 A1 | 3/2015 | Pitts |
| 2015/0095788 A1 | 4/2015 | Thiele et al. |
| 2015/0096011 A1 | 4/2015 | Watt |
| 2015/0106802 A1 | 4/2015 | Ivanov et al. |
| 2015/0142745 A1 | 5/2015 | Tekade et al. |
| 2015/0142747 A1 | 5/2015 | Zou |
| 2015/0143164 A1 | 5/2015 | Veerla et al. |
| 2015/0172412 A1 | 6/2015 | Escriva et al. |
| 2015/0178019 A1 | 6/2015 | Hegdal et al. |
| 2015/0205639 A1 | 7/2015 | Matsumoto et al. |
| 2015/0213032 A1 | 7/2015 | Powell et al. |
| 2015/0215389 A1 | 7/2015 | Spencer |
| 2015/0220324 A1 | 8/2015 | Arcese et al. |
| 2015/0242291 A1 | 8/2015 | Chang et al. |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0309891 A1 | 10/2015 | Saika |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0355862 A1 | 12/2015 | Hayes et al. |
| 2015/0378761 A1 | 12/2015 | Sevigny et al. |
| 2015/0378853 A1 | 12/2015 | Sevigny et al. |
| 2016/0004693 A1 | 1/2016 | Chen et al. |
| 2016/0011898 A1 | 1/2016 | Lee et al. |
| 2016/0070492 A1 | 3/2016 | Cherubini et al. |
| 2016/0077988 A1 | 3/2016 | Tipton et al. |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179416 A1 | 6/2016 | Mutha et al. |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy et al. |
| 2016/0301766 A1 | 10/2016 | Ionescu et al. |
| 2016/0316003 A1 | 10/2016 | Snider et al. |
| 2016/0328226 A1 | 11/2016 | Arya et al. |
| 2016/0335108 A1 | 11/2016 | Ryu et al. |
| 2016/0335134 A1 | 11/2016 | Gupta et al. |
| 2016/0359697 A1 | 12/2016 | Scheib et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0109184 A1 | 4/2017 | Ramani et al. |
| 2017/0149886 A1 | 5/2017 | Shetty |
| 2017/0160983 A1 | 6/2017 | Fiske et al. |
| 2017/0177638 A1 | 6/2017 | Bhosale et al. |
| 2017/0193021 A1 | 7/2017 | Deng et al. |
| 2017/0206074 A1 | 7/2017 | Arcese et al. |
| 2017/0206207 A1 | 7/2017 | Bondurant et al. |
| 2017/0220661 A1 | 8/2017 | Cao et al. |
| 2017/0228300 A1 | 8/2017 | Thomas et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Ventatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0262346 A1 | 9/2017 | Pradhan et al. |
| 2017/0264684 A1 | 9/2017 | Spillane et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |
| 2017/0302731 A1 | 10/2017 | Cui |
| 2018/0004766 A1 | 1/2018 | Darling |
| 2018/0011766 A1 | 1/2018 | Lee et al. |
| 2018/0062993 A1 | 3/2018 | Wu et al. |
| 2018/0113623 A1 | 4/2018 | Sancheti |
| 2018/0129426 A1 | 5/2018 | Aron et al. |

(56) References Cited

U.S. PATENT DOCUMENTS

| | | | |
|---|---|---|---|
| 2018/0143845 A1 | 5/2018 | Chawla et al. |
| 2018/0143880 A1 | 5/2018 | Dornemann |
| 2018/0145960 A1 | 5/2018 | Bakshan et al. |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0196719 A1 | 7/2018 | Glass |
| 2018/0205787 A1 | 7/2018 | Ben Dayan et al. |
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Venkatesh et al. |
| 2019/0034240 A1 | 1/2019 | Nabi et al. |
| 2019/0079747 A1 | 3/2019 | Sinha et al. |
| 2019/0129807 A1 | 5/2019 | Zhang |
| 2019/0129808 A1 | 5/2019 | Acharya et al. |
| 2019/0179918 A1 | 6/2019 | Singh et al. |
| 2019/0196718 A1 | 6/2019 | Pai et al. |
| 2019/0207925 A1 | 7/2019 | Anantha Padmanaban et al. |
| 2019/0228147 A1 | 7/2019 | Formato et al. |
| 2019/0243703 A1 | 8/2019 | Rooney et al. |
| 2019/0332683 A1 | 10/2019 | Thummala et al. |
| 2019/0339883 A1 | 11/2019 | Aron et al. |
| 2020/0004424 A1 | 1/2020 | Khan et al. |
| 2020/0004641 A1 | 1/2020 | Singhal et al. |
| 2020/0007530 A1 | 1/2020 | Mohamad Abdul et al. |
| 2020/0034069 A1 | 1/2020 | Batra et al. |
| 2020/0036647 A1 | 1/2020 | Gupta et al. |
| 2020/0081704 A1 | 3/2020 | Bafna et al. |
| 2020/0081733 A1 | 3/2020 | Buck et al. |
| 2020/0106669 A1 | 4/2020 | Dhillon et al. |
| 2020/0125580 A1 | 4/2020 | Shao |
| 2020/0137157 A1 | 4/2020 | Joseph et al. |
| 2020/0193059 A1 | 6/2020 | Narayanswamy et al. |
| 2020/0274869 A1 | 8/2020 | Tahenakos et al. |
| 2021/0004454 A1 | 1/2021 | Chester et al. |
| 2021/0049074 A1 | 2/2021 | Bezerra Maimoni et al. |
| 2021/0049079 A1 | 2/2021 | Kumar et al. |
| 2021/0141630 A1 | 5/2021 | Sharpe et al. |
| 2021/0157690 A1 | 5/2021 | Wexler et al. |
| 2021/0200641 A1 | 7/2021 | Bafna et al. |
| 2021/0224233 A1 | 7/2021 | Bafna et al. |
| 2021/0247973 A1 | 8/2021 | Gupta et al. |
| 2021/0318132 A1 | 10/2021 | Simpson |
| 2021/0318938 A1 | 10/2021 | Benke et al. |
| 2021/0326358 A1 | 10/2021 | Seelemann, II et al. |
| 2021/0334178 A1 | 10/2021 | Yang et al. |
| 2021/0342237 A1 | 11/2021 | Polimera et al. |
| 2021/0344772 A1 | 11/2021 | Arikatla et al. |
| 2021/0349859 A1 | 11/2021 | Bafna et al. |
| 2021/0365257 A1 | 11/2021 | Venkatesh et al. |
| 2021/0373815 A1 | 12/2021 | Kumar et al. |
| 2021/0390080 A1 | 12/2021 | Tripathi et al. |
| 2021/0397587 A1 | 12/2021 | Thummala et al. |
| 2021/0406136 A1 | 12/2021 | Venkatesh et al. |
| 2022/0004377 A1 | 1/2022 | Sharpe et al. |
| 2022/0012208 A1 | 1/2022 | Singhal et al. |
| 2022/0091947 A1 | 3/2022 | Kothari et al. |
| 2022/0147342 A1 | 5/2022 | Sharpe et al. |
| 2022/0147495 A1 | 5/2022 | Sharpe et al. |
| 2022/0156107 A1 | 5/2022 | Bafna et al. |
| 2022/0283708 A1 | 9/2022 | Grunwald et al. |
| 2022/0292002 A1 | 9/2022 | Kumar et al. |
| 2022/0300335 A1 | 9/2022 | Venkatesh et al. |
| 2023/0056217 A1 | 2/2023 | Rathi et al. |
| 2023/0056425 A1 | 2/2023 | Gopalapura Venkatesh et al. |
| 2023/0066137 A1 | 3/2023 | Vijapurapu et al. |
| 2023/0068262 A1 | 3/2023 | Bafna et al. |
| 2023/0082186 A1 | 3/2023 | Balcha et al. |
| 2023/0101337 A1 | 3/2023 | Ahmad et al. |
| 2023/0237022 A1 | 7/2023 | Thomas et al. |
| 2023/0237170 A1 | 7/2023 | Thummala et al. |
| 2023/0267053 A1 | 8/2023 | Khanna et al. |
| 2024/0045774 A1 | 2/2024 | Wang et al. |
| 2024/0070032 A1 | 2/2024 | Wang et al. |
| 2025/0103738 A1 | 3/2025 | Verma et al. |

FOREIGN PATENT DOCUMENTS

| | | | |
|---|---|---|---|
| CN | 110516005 A | 11/2019 |
| CN | 110519112 A | 11/2019 |
| CN | 110569269 A | 12/2019 |
| EP | 1062581 B1 | 10/2003 |
| EP | 1214663 B1 | 6/2006 |
| EP | 1979814 A2 | 10/2008 |
| WO | 2010050944 A1 | 5/2010 |
| WO | 2012126177 A2 | 9/2012 |
| WO | 2016018446 A1 | 2/2016 |
| WO | 2018014650 A1 | 1/2018 |

OTHER PUBLICATIONS

Isilon OneFS, Version 8.0.1; Web Administration Guide, Oct. 2016,.

Dell EMC; Dell EMC Isilon OneFS Operating System; Scale-out NAS to maximize the data capital and business value of your unstructured data, 2020, pp. all.

Dell EMC; White Paper; Dell EMC Isilon Onefs Operating System; Powering the Isilon Scale-Out Storage Platform, Dec. 2019, pp. all.

"Administering VMware vSAN—VMware vSphere 7.0", Update 1; docs.vmware.com/en/VMware-vSphere/7.0/vsan-701-administration-guide.pdf, 2015-2020, pp. 1-114.

"Backup vSAN 7 File Share with Veeam Backup & Replication 10", Sysadmin Stories, https://www.sysadminstories.com/2020/06/backup-vsan-7-file-share-with-veeam.html, Jun. 2, 2020, pp. 1-7.

"Characteristics of a vSAN Cluster", VMWare Docs; retrieved from: https://docs.vmware.com/en/VMware-vSphere/7.0/com.vmware.vsphere.vsan-planning.doc/GUID-C0818534-7B96-43E4-93BB-7955449852DE.html, May 31, 2019, pp. 1-2.

"Clustered Data ONTAP 8.2 File Access Management Guide for CIFS", NetApp; (year 2014), Feb. 2014, pp. all.

"Common Tasks—Remote Replication", Arcserve https://support.storagecraft/com/s/article/common-tasks-remote-replication-ox?language=en_US, Oct. 20, 2021, pp. 1-11.

"Designing and Sizing Virtual SAN Fault Domains", Administering VMware Virtual SAN; VMware vSphere 6.5; vSAN 6.6; https://docs.vmware.com/en/VMware-vSphere/6.5/virtual-san-66-administration-guide.pdf, captured Aug. 20, 2021, 2017, pp. 34.

"EMC Isilon OneFS Operating System; Powering scale-out storage for the new world of Big Data in the enterprise", www.EMC.com, Feb. 2020, pp. all.

"Enabling or disabling SMB automatic node referrals", NetApp https://docs.netapp.com/ontap-9/index.jsp?topic=%2Fcom.netapp.doc.cdot-famg-cifs%2FGUID-AC7E8515-3A4C-4BB5-A8C8-38B565C952E0.html, Sep. 19, 2019, pp. all.

"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html, Sep. 19, 2019, pp. all.

"High Availability and Data Protection With Dell EMC Isilon Scale-Out NAS", Dell: Dell Inc., Jul. 2018, pp. all.

"How to troubleshoot the 'Autolocation' feature in Clustered Data ONTAP", NetApp https://kb.netapp.com/app/answers/answer_view/a_id/1030857/loc/en_US#__highlight, Sep. 19, 2019, pp. all.

"How to Troubleshoot the 'Autolocation' feature in Clustered Data ONTAP—Results", NetApp https://kb.netapp.com/app/results/kw/autolocation/, Sep. 19, 2019, pp. all.

"Hybrid Cloud Storage with Cloudian HyperStore and Amazon S3", Cloudian Inc.; www.cloudian.com, 2014, pp. all.

"Improving client response time by providing SMB automatic node referrals with Auto Location", NetApp https://library.netapp.com/ecmdocs/ECMP1196891/html/GUID-0A5772A4-A6D7-4A00-AC2A-92B868C5B3B5.html, Sep. 19, 2019, pp. all.

(56)                References Cited

OTHER PUBLICATIONS

"Managing Workloads", NetApp https://docs.netapp.com/ontap-9/index.jsp?topic=%2Fcom.netapp.doc.pow-perf-mon%2FGUID-13D35FC5-AF37-4BBD-8A8E-B10B41451A16.html, Sep. 19, 2019, pp. all.

"Nutanix AFS—Introduction & Steps For Setting Up", Retrieved from https ://virtual building blocks. com/2 0 1 8/01 /03/nutanix-afs-introduction-steps-for-setting-up/ (Year: 2018), Jan. 3, 2018, 1-23.

"Nutanix Files Guide", Nutanix Files 3.7, Nov. 23, 2021, pp. 1-174.

"Nutanix Files Guide", Nutanix, Sep. 14, 2018, pp. all.

"Nutanix-Files", Nutanix, Inc. v7.0 https://download.nutanix.com/solutionsDocs/TN-2041-Nutanix-Files.pdf, Oct. 2021, pp. 1-89.

"Path Failover and Virtual Machines", vSphere Storage; Update 2; VMware vSphere 7.0; VMware ESXi 7.0; vCenter Server 7.0; https://docs.vmware.com/en/VMware-vSphere/7.0/vsphere-esxi-vcenter-server-702-storage-guide.pdf, Jun. 25, 2021, pp. 238.

"Preparing Storage Systems for Snapmirror Replication", NetApp ; NetApp, Apr. 2005, pp. all.

"Protect Your Data With NetApp Element Software", Solution Brief; NetApp, 2018, pp. all.

"Server-to-Server Storage Replication with Storage Replica", Microsoft https://docs.microsoft.com/en-us/windows-server/storage/storage-replica/server-to-server-storage-replication,, Jul. 29, 2021, pp. 1-20.

"Setting up and Using Acropolis File Services (AFS) on Nutanix AOS 5.0", Virtual Dennis—Sharing Technical Tips Learned the Hard Way, Dec. 30, 2016, pp. all.

"Storage Replica Overview", Microsoft thttps://docs.microsoft.com/en-us/windows-server/storage/storage-replica/storage-replica-overview, Jul. 29, 2021, pp. 1-11.

"Tech TopX: AHV One Click Upgrade", Screen captures from YouTube video clip, 13 pages, uploaded on Dec. 8, 2015 by user "Nutanix University". Retrieved from Internet: https://www.youtube.com/watch?v=3dALdzw6qZM, Dec. 8, 2015, pp. all.

"Technical Overview and Best Practices", VMware vSphere VMFS ; a VMware Technical White Paper updated for VMware vSphere 5.1, Version 3.0, Nov. 27, 2012, pp. all.

"Understanding Multipathing and Failover", vSphere Storage; VMware vSphere 7.0; VMware ESXi 7.0; vCenter Server 7.0 https://docs.vmware.com/en/VMware-vSphere/7.0/vsphere-esxi-vcenter-server-702-storage-guide.pdf, Jun. 25, 2021, pp. 234-268.

"Virtual Disk Manager User's Guide: Virtual Disk Development Kit", vmware.com; https://www.vmware.com/pdf/VirtualDiskManager.pdf, 2008, 1-12.

"VMware vCenter Server: Centrally Mananged Virtual Infrastructure Delivered with Confidence", VMWare Datasheet; https://www.vmware.com/content/dam/digitalmarketing/vmware/en/pdf/products/vCenter/vmware-vcenter-server-datasheet.pdf, captured Aug. 20, 2021, 2015, 2015, pp. 1-2.

"VMware VSAN 7.0 Release Notes", VMware; https://docs.vmware.com/en/VMware-vSphere/7.0/rn/vmware-vsan-70-release-notes.html, Mar. 8, 2021, pp. 1-12.

"VSAN 7.0 U2 Proof of Concept Guide", VMwareStorage; https://images.core.vmware.com/sites/default/files/resource/vsan_70_u2_proof_of_concept_guide_noindex.pdf, Apr. 2021, pp. 1-267.

"VSAN File Services Tech Note | VMware", Aug. 2021, 1-7.

"VSAN Health Service—File Service—File Server Health (77165)", VMware, Knowledge Base; https://kb.vmware.com/s/article/77165, May 15, 2021, pp. 1-5.

"VSAN Monitoring and Troubleshooting—VMware vSphere 7.0", https://docs.vmware.com/, Sep. 2018, 1-61.

"VSAN Performance Graphs in the vSphere Web Client (2144493)", Nov. 9, 2020, 1-42.

"VSan Planning and Deployment", Update 2 VMWare vSphere 6.7; VMware vSAN 6.7; https://docs.vmware.com/en/VMware-vSphere/6.7/vsan-673-planning-deployment-guide.pdf, Aug. 20, 2019, pp. 1-85.

"VSan Stretched Cluster Guide", VMwareStorage; https://images.core.vmware.com/sites/default/files/resource/vsan_stretched_cluster_guide_noindex.pdf, printed Jun. 24, 2021, Jun. 2020, pp. 1-62.

"VSphere Availability—VMware vSphere 6.7", https://docs.vmware.com/, Jan. 11, 2019, 1-105.

"VSphere Storage—VMware vSphere 6.7", https://docs.vmware.com/, Jan. 4, 2021, 1-382.

Bhardwaj, Rishi , "The Wonderful World of Distributed Systems and the Art of Metadata Management", Nutanix, Inc., https://www.nutanix.com/blog/the-wonderful-world-of-distributed-systems-and-metadata-management; captured Aug. 19, 2021, Sep. 24, 2015, pp. 1-8.

Birk, Ryan , "How it Works: Understanding vSAN Architecture Components", altaro.com, Feb. 28, 2018, 1-10.

Bounds, Jay , "High-Availability (HA) Pair Controller Configuration Overview and Best Practices", NetApp, Feb. 2016, pp. all.

Cano, Ignacio et al., "Curator: Self-Managing Storage for Enterprise Clusters", University of Washington, Mar. 2017, pp. all.

Cormac, , "Native File Services for vSAN 7", CormacHogan.com; https://cormachogan.com/2020/03/11/native-file-services-for-vsan-7/, Mar. 11, 2020, 1-23.

Costa, Jorge , "High Availability Setup Using Veritas Cluster Server and NetApp Synchronous SnapMirror—One button Failover/Failback with SnapMirror Sync and Veritas Cluster Server", NetApp Community, Nov. 18, 2010, pp. all.

Feroce, Danilo , "Leveraging VMware vSAN for Highly Available Management Clusters", VMware, Inc., Version 2.9, VMware, Inc.; https://www.vmware.com/content/dam/digitalmarketing/vmware/en/pdf/vcat/vmware-leveraging-virtual-san-for-ha-management-clusters.pdf, Jan. 2018, 1-22.

Fojta, Tomas , "Quotas and Quota Policies in VMware Cloud Director", Tom Fojta's Blog; retrieved from: https://fojta.wordpress.com/2020/11/06/quotas-and-quota-policies-in-vmware-cloud-director/, Nov. 6, 2020, 1-4.

Fojta, Tomas , "vSAN File Services with vCloud Director—Tom Fojta's Blog", (wordpress.com) ("Fojta Blog"), Feb. 11, 2021, pp. 1-8.

Hogan, Cormac , "New updates from Nutanix—NOS 3.0 and NX-3000", https://cormachogan.com/2012/12/20/new-from-nutanix-nos-3-0-nx-3000/, Dec. 20, 2012, pp. 1-7.

Jung, Young-Woo et al., "Standard-Based Vitrual Infrastructure Resource Management for Distributed and Heterogeneous Servers", ICACT, Feb. 15, 2009, pp. all.

Kaam, Bas V. , "New in AOS 5.0: Nutanix Acropolis File Services", basvankaam.com, Jan. 5, 2017, pp. all.

Kemp, Erik , "NetApp SolidFire SnapMirror Architecture and Configuration", Technical Report, NetApp, Dec. 2017, pp. all.

Kleyman, Bill , "How Cloud Computing Changes Storage Tiering", https://www.datacenterknowledge.com ; captured Jun. 4, 2019, Nov. 12, 2015, pp. all.

Leibovici, Andre , "Nutanix One-Click Upgrade now takes care of Firmware and Hypervisor too!", myvirtualcloud.net https://myvirtualcloud.net/nutanix-one-click-upgrade-now-takes-care-of-firmware-and-hypervisor-too/, Jul. 31, 2014, pp. 1-4.

Poitras, Steven , "The Nutanix Bible", https://nutanixbible.com/, Apr. 9, 2019, pp. all.

Poitras, Steven , "The Nutanix Bible", http://stevenpoitras.com/the-nutanix-bible/ (Publication date based on indicated capture date by Archive.org; first publication date unknown), Jan. 11, 2014, pp. all.

Poitras, Steven , "The Nutanix Bible", https://nutanixbible.com/, Jan. 12, 2016, pp. all.

Poitras, Steven , "The Nutanix Bible", https://nutanixbible.com/, Jan. 3, 2017, pp. all.

Poitras, Steven , "The Nutanix Bible", https://nutanixbible.com/, Jan. 3, 2018, pp. all.

Poitras, Steven , "The Nutanix Bible", http://stevenpoitras.com/the-nutanix-bible/ (Publication date based on indicated capture date by Archive.org; first publication date unknown), Jan. 7, 2015, pp. all.

Poitras, Steven , "The Nutanix Bible", https://nutanixbible.com/, Jan. 8, 2019, pp. all.

Poitras, Steven , "The Nutanix Bible", https://nutanixbible.com/, Jul. 25, 2019, pp. all.

Poitras, Steven , "The Nutanix Bible", http://stevenpoitras.com/the-nutanix-bible/ (Publication date based on indicated capture date by Archive.org; first publication date unknown), Jun. 20, 2014, pp. all.

(56)　　　　　References Cited

OTHER PUBLICATIONS

Poitras, Steven , "The Nutanix Bible", https://nutanixbible.com/, Jun. 25, 2018, pp. all.

Poitras, Steven , "The Nutanix Bible", https://nutanixbible.com/, Jun. 8, 2017, pp. all.

Poitras, Steven , "The Nutanix Bible", http://stevenpoitras.com/the-nutanix-bible/ (Publication date based on indicated capture date by Archive.org; first publication date unknown), Jun. 9, 2015, pp. all.

Poitras, Steven , "The Nutanix Bible", https://nutanixbible.com/, Jun. 9, 2016, pp. all.

Poitras, Steven , "The Nutanix Bible", https://nutanixbible.com/, Mar. 2, 2021, pp. all.

Poitras, Steven , "The Nutanix Bible", http://stevenpoitras.com/the-nutanix-bible/ (Publication date based on indicated capture date by Archive.org; first publication date unknown), Oct. 15, 2013, pp. all.

Poitras, Steven , "The Nutanix Bible", https://nutanixbible.com/, Sep. 1, 2020, pp. all.

Poitras, Steven , "The Nutanix Bible", https://nutanixbible.com/, Sep. 17, 2019, pp. all.

Poitras, Steven , "The Nutanix Bible", https://nutanixbible.com/, Sep. 3, 2021, pp. all.

Poitras, Steven , "The Nutanix Bible", https://nutanixbible.com/, Sep. 4, 2015, pp. all.

Poitras, Steven , "The Nutanix Bible", https://nutanixbible.com/, Duplicate of ref. No. 72511, Mar. 2, 2020, pp. all.

Rajendran, Cedric , "Working with vSAN Health Checks", VMware vSan Virtual Blocks Blog; https://blogs.vmware.com/virtualblocks/2019/07/18/working-with-vsan-health-checks/, Jul. 18, 2019, pp. 1-6.

Ruth, Paul , "Autonomic Live Adaption of Virtual Computational Environments in a Multi-Domain Infrastructure", 2006 IEEE International Conference on Autonomic Computing, 2006, pp. 5-14.

Seget, Vladan , "VMware vSAN 7 now with native file services and quotas", 4sysops; https://4sysops.com/archives/vmware-vsan-7-now-with-native-file-services-and-quotas/, May 1, 2020,.

Seget, Vladan , "VMware vSphere 7.0 and vSAN storage improvements", retrieved from: https://4sysops.com/archives/vmware-vsphere-7-0-and-vsan-storage-improvements/, Apr. 1, 2020, pp. 1-12.

Sturniolo, Andy , "VMware vSAN File Services and Veeam", Veeam Blog, https://www.veeam.com/blog/veeam-backup-vsan-file-services.html, Jul. 22, 2020, 1-9.

* cited by examiner

External SID to Internal SID (Global ID) Conversion
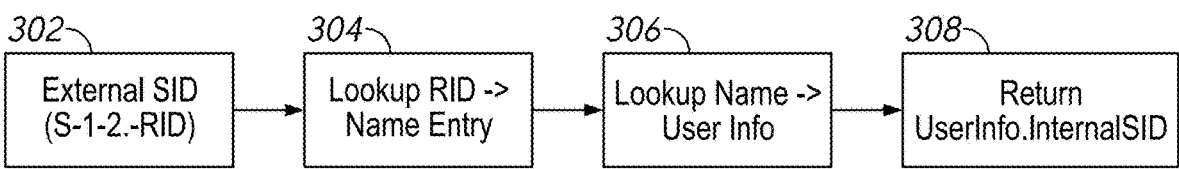
*FIG. 3A*
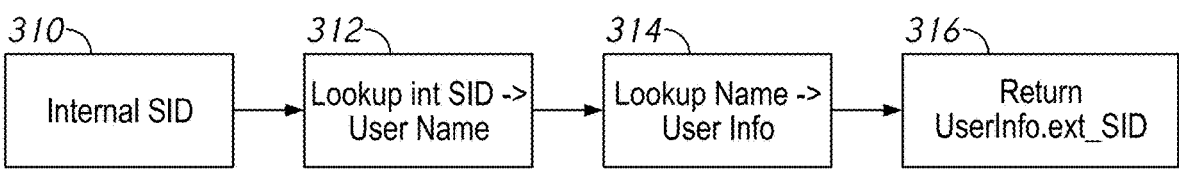
*FIG. 3B*
Flow of ACL Update
| From Client → | ACL with External SIDs (318) | Convert Local External SIDs to Internal SIDs → | ACL with Internal SIDs (320) | Save to File System → | Files Metadata (322) |
*FIG. 3C*

Flow of ACL Retrieval for Client (User, Etc.)

Flow for Access (and/or Authentication) Check

CONSISTENT ACCESS CONTROL LISTS ACROSS FILE SERVERS FOR LOCAL USERS IN A DISTRIBUTED FILE SERVER ENVIRONMENT

CROSS REFERENCE TO RELATED APPLICATION(S)

This application is a divisional of U.S. application Ser. No. 17/648,735 filed Jan. 24, 2022, which issues as U.S. Pat. No. 12,153,690 on Nov. 26, 2024, which are incorporated herein by reference, in their entirety, for any purpose.

TECHNICAL FIELD

Examples described herein relate generally to virtualized environments. Examples of systems and techniques are described which facilitate consistent access control lists across file servers for local users. Examples of the use of both a global ID and a local user system identification (SID) are described.

BACKGROUND

Traditionally, when data is created on a first file server and then migrated at the block level to a second file server, that replication often results in access control list inconsistencies. This is because when the ACLs from the first file server are replicated to the second file server, the destination file system cannot understand or interpret the first file server's data structures.

BRIEF DESCRIPTION OF THE DRAWINGS

FIG. 3A is a flowchart for an external SID (e.g., local user SID) to an internal global ID conversion, arranged in accordance with examples described herein.

FIG. 3B is a flowchart for an internal global ID to external SID conversion, arranged in accordance with examples described herein.

FIG. 3C is a flowchart for an ACL update, arranged in accordance with examples described herein.

DETAILED DESCRIPTION

Figure 1:
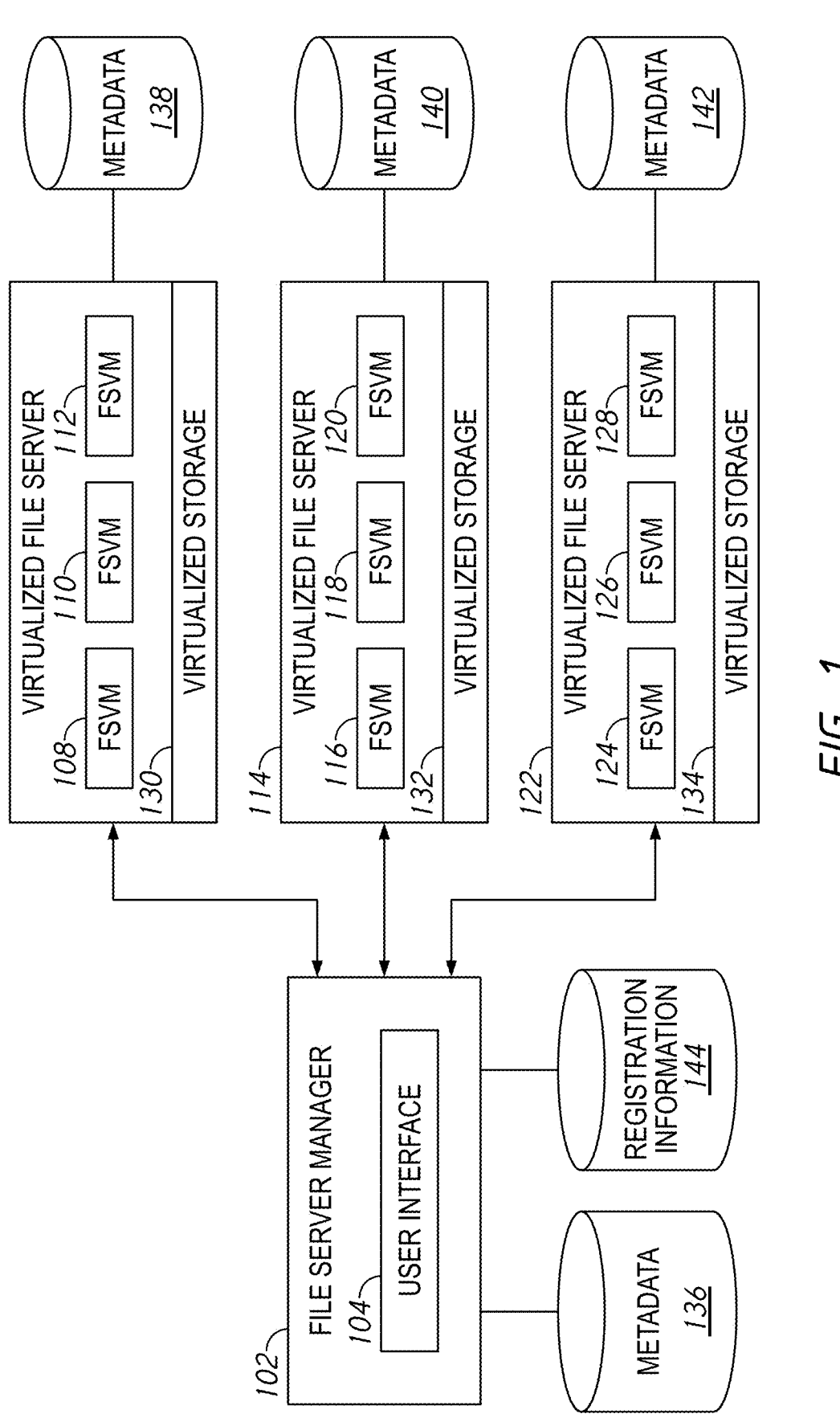
FIG. 1 is a schematic illustration of a system, arranged in accordance with examples described herein.

Certain details are set forth herein to provide an understanding of described embodiments of technology. However, other examples may be practiced without various of these particular details. In some instances, well-known computing system components, virtualization operations, and/or software operations have not been shown in detail in order to avoid unnecessarily obscuring the described embodiments. Other embodiments may be utilized, and other changes may be made, without departing from the spirit or scope of the subject matter presented here.

Traditionally, when data is created on a first file server and then migrated at the block level to a second file server, that replication often results in access control list inconsistencies. This is because when the ACLs from the first file server are replicated to the second file server, the destination file system cannot understand or interpret the first file server's data structures (and/or security identifies, SIDs, etc.). For example, local users (e.g., users who are not in an Active Directory for the file server) may be given a local user system identification (SID) by the first file server, which identifies the first file server (e.g., has a prefix associated with the first file server). The replicated ACLs become invalid upon migration to the second file server because the second file server cannot interpret the SID for the local user particular to the first file server, which is stamped in the ACL.

Example embodiments described herein are generally directed towards file server access controls, and more specifically towards a mechanism to create consistent access control lists for local users across different file servers in a distributed file server virtual machine (FSVM) environment. In examples described herein, a local user may be provided an SID (e.g., local user system identification (SID); local user security identifier (SID)) by a file server, which is specific to the file server. The file server may communicate with the user using the local user SID. Accordingly, the local user SID may be referred to as an external SID for the user. The local user SID may be specific to the file server which created the local user SID—e.g., some portion of the local user SID (such as a domain prefix portion, suffix portion, or other portion of the local user SID) may be created based on the identity of the file server which created the SID. Typically, the SID would be stored in (e.g., stamped in) any access control list storing access control information for the user. However, if the data is moved to another file server (e.g., at the block level, etc.), the other file server (e.g., the receiving file server, the destination file server, etc.) may be unable to read or interpret the local user SID to give the user access to the appropriate data at the appropriate levels. In some examples, this because the destination file server may not be able to interpret the local user SID specific to the source file server.

Accordingly, in examples described herein, the file server may assign a global ID to a local user. The global ID may be assigned based on a hash function applied to and/or using one or more user attributes of the user. In this manner, the global ID may be specific to the user, but not specific to the file server. The file server may utilize this global ID to determine access controls for the user, and the global ID may be written to (e.g., stamped in) the ACL. This way, when the ACL is moved to another file server (e.g., the receiving file server, the destination file server, etc.), it contains the global ID for the local user. When the local user requests access to data from the destination file server, the local user may be registered with the destination file server. The destination file server may assign (and/or map) a local user SID to the local user, which may be specific to the destination file server. However, the destination file server may additionally and/or alternatively assign a global ID to the local user. The global ID being assigned based on the same hash function of user attributes used by the source file server.

Accordingly, the same global ID will be generated and assigned by the destination file server to the same local user. The destination file server will use the global ID to determine access controls for the local user (e.g., to access the ACL). Accordingly, the correct and consistent access controls may be applied for the local user at the destination file server. As should be appreciated, while a virtualized environment is described in some examples herein, including examples of file servers comprising clusters of computing nodes configured to provide a distributed file system, the systems and methods described herein may be used in other environments (e.g., non-virtualized environments, etc.).

FIG. 1 is a schematic illustration of a system arranged in accordance with examples described herein. The system of FIG. 1 includes file server manager 102. The file server manager 102 may provide user interface 104. The file server manager 102 may be in communication with memory and/or storage for metadata 136 and registration information 144. The system of FIG. 1 further includes virtualized file server 106, virtualized file server 114, and virtualized file server 122. The virtualized file server 106, virtualized file server 114, and virtualized file server 122 may each be in communication with the file server manager 102 (e.g., over one or more networks). Each of the virtualized file server 106, virtualized file server 114, and virtualized file server 122 may be hosted in a same and/or different virtualization environment. Each of the virtualized file server 106, virtualized file server 114, and virtualized file server 122 may include a cluster of computing nodes hosting a cluster of file server virtual machines (FSVM). For example, the virtualized file server 106 includes FSVM 108, FSVM 110, and FSVM 112. The virtualized file server 114 includes FSVM 116, FSVM 118, and FSVM 120. The virtualized file server 122 includes FSVM 124, FSVM 126, and FSVM 128. Each of the virtualized file server 106, virtualized file server 114, and virtualized file server 122 may include virtualized storage. For example, the virtualized file server 106 may include virtualized storage 130, the virtualized file server 114 may include virtualized storage 132, and the virtualized file server 122 may include virtualized storage 134. Moreover, each of the virtualized file server 106, virtualized file server 114, and virtualized file server 122 may include storage and/or memory for storing metadata. The virtualized file server 106 may store metadata 138. The virtualized file server 114 may store metadata 140. The virtualized file server 122 may store metadata 142.

The components shown in FIG. 1 are exemplary only. Additional, fewer, and/or different components may be used in other examples. For example, three virtualized file servers are depicted in FIG. 1, however any number may be used and may be in communication with the file server manager 102. In some examples, while file server manager 102 is described herein, additional and/or alternative file server managers may also be used to implement and/or use the systems and methods described herein.

Examples of systems described herein may accordingly include one or more virtualized file servers, such as virtualized file server 106, virtualized file server 114, and virtualized file server 122 in FIG. 1. A virtualized file server may represent a logical entity in the system. Virtualized file servers described herein may be hosted in generally any virtualization environment (e.g., on generally any virtualization platform). The virtualization environment and/or platform generally refers to the storage resources that have been virtualized by the virtualized file server and the compute resources (e.g., computing nodes with processor(s)) used to manage the virtualized storage. For example, the virtualized file server 106 may be hosted on a different virtualization environment than the virtualized file server 114 and/or than the virtualized file server 122. Nonetheless, in some examples one or more virtualized file servers in communication with a file server manager may be hosted in a same virtualization environment. Examples of virtualization environments include, for example, on premises installations of one or more computing nodes and storage devices. Examples of virtualization environment include one or more cloud computing systems (e.g., Amazon Web Services, MICROSOFT AZURE). Although not shown explicitly in FIG. 1, virtualization environments and/or virtualized file servers may include additional components including, but not limited to, one or more hypervisors, storage controllers, operating systems, and/or container orchestrators (e.g., Kubernetes). The multiple virtualized file servers in communication with a file server manager described herein may in some examples be located in different geographic locations (e.g., different buildings, states, cities, or countries).

A virtualized file server may include a cluster of virtual machines and/or other virtualized entities (e.g., containers), which may be referred to as file server virtual machines (FSVMs). In some examples, each of the file server virtual machines of a cluster may be implemented on different computing nodes forming a computing node cluster. For example, the FSVM 108, FSVM 110, and FSVM 112 of virtualized file server 106 may each be implemented on separate computing nodes of a computing node cluster used by the virtualized file server 106. Similarly, the FSVM 116, FSVM 118, and FSVM 120 may each be implemented on separate computing nodes of a computing node cluster used by the virtualized file server 114. Similarly, the FSVM 124, FSVM 126, and FSVM 128 may each be implemented on separate computing nodes of a computing nodes cluster. In some examples, a cluster of FSVMs may be implemented on a cloud computing system.

The FSVMs may operate to provide a file system on the storage resources of the virtualized file server. The file system may have a single namespace and may store data in accordance with filenames and/or directories. The FSVMs may accordingly support one or more file system protocols, such as NFS and/or SMB. A virtualized file server (such as virtualized file server 106, virtualized file server 114, and/or virtualized file server 122) may translate file system protocol requests for one or more files and/or directories (e.g., a file path) into one or more storage requests to access the data corresponding to the file, directory, and/or file path. Any of a variety of components of the virtualized file server may be used to perform the translation (e.g., one or more FSVMs, one or more hypervisors, and/or one or more storage controllers). The translation may be performed using a map (e.g., a shard map) relating the location of the data to the file name, directory, and/or file path.

Virtualized file servers described herein may include virtualized storage. For example, the virtualized file server 106 may include virtualized storage 130. The virtualized file server 114 may include virtualized storage 132. The virtualized file server 122 may include virtualized storage 134. The virtualized storage may generally include any number or kind of storage devices—for example, network attached storage, local storage of one or more computing nodes forming the virtualized file server, and/or cloud storage. Storage devices may be implemented using, for example one or more memories, hard disk drives, solid state drives. The virtualized storage for a particular virtualized file server may be referred to as a storage pool. The virtualized storage may store one or more shares. Generally, the virtualized storage may refer to a storage pool which may include any of a variety of storage devices. In some examples, the virtualized file server(s), may be implemented in a hyperconverged architecture. For example, the storage pool may include local storage devices of the computing nodes used to host the virtualized file server. For example, virtualized storage 130 may include a storage pool. One or more shares of a file system provided by the virtualized file server 106 may be distributed across storage device of the storage pool, including local storage devices of one or more computing nodes on which the FSVM 108, FSVM 110, and/or FSVM 112 reside. In some examples, each file server virtual machine (FSVM) may manage (e.g., host) a corresponding share or a portion of the share. A map may store associations between shares and files, directories, and/or file paths.

Virtualized file servers described herein may include metadata. For example, virtualized file server 106 may include metadata 138. The virtualized file server 114 may include metadata 140. The virtualized file server 122 may include metadata 142. The metadata may be stored, for example, in the virtualized storage and/or other storage location accessible to the virtualized file server. The metadata may in some examples be distributed across the storage pool of a virtualized file server. In some examples, the metadata may be stored in a database accessible to and/or hosted by the virtualized file server. Metadata stored by a virtualized file server may include, for example, authentication information for the virtualized file server and/or virtual machines in the virtualized file server, authorization information for the virtualized file server and/or virtual machines in the virtualized file server, configuration information for the virtualized file server and/or virtual machines in the virtualized file server, end point information (e.g., supported API calls and/or endpoints), a number of shares stored in the virtualized storage of the virtualized file server, a protocol supported by each share and/or FSVM (e.g., NFS and/or SMB), identities of the shares stored in the virtualized storage of the virtualized file server, a number of file server virtual machines (FSVMs) present in the virtualized file server, a number of files and/or directories hosted by the virtualized file server, compute resources available and/or used at the virtualized file server, storage resources available and/or used at the virtualized file server, or other metadata regarding the virtualized file server. The metadata may be maintained by the virtualized file server, for example, the metadata may be updated as the number of shares, FSVMs, storage resources and/or compute resources change.

Examples described herein may include a file server manager, such as file server manager 102 of FIG. 1. A file server manager may be in communication with multiple virtualized file servers. For example, the file server manager 102 may be in communication with virtualized file server 106, virtualized file server 114, and virtualized file server 122. In this manner, the file server manager 102 may allow for access to, maintenance of, and/or management of multiple virtualized file servers (e.g., multiple file systems). An enterprise may have many virtualized file servers that are desired to be managed—for example, different geographic locations of the enterprise may maintain separate file systems and/or implement different privacy or other data policies. In some examples, different departments or entities within an organization may maintain respective virtualized file servers. An administrator or other entity associated with the enterprise, such as an IT manager, may advantageously view, access, and/or manage multiple virtualized file servers using the file server manager (e.g., file server manager 102). The file server manager may communicate with each virtualized file server using any of a variety of connections, including one or more networks. In some examples, a same network may be used to communicate between the file server manager and multiple virtualized file servers. In some examples, multiple networks may be used.

File server managers, such as file server manager 102 of FIG. 1 may be implemented using one or more computing devices. In some example, an administrative computing system may be used. The administrative computing system may include, for example, one or more processors and non-transitory computer readable media encoded with instructions for performing the file server manager operations described herein. In some examples, the file server manager may be implemented using a computing device different than the computing devices (e.g., computing nodes) used to implement the virtualized file server(s) with which the file server manager is in communication. In some examples, the file server manager may be hosted on one of the computing nodes forming a part of a virtualized file server in communication with the file server manager. File server managers, such as file server manager 102, may be hosted on premises systems in some examples, and/or on cloud computing systems in some examples.

Examples of file server managers described herein may provide one or more user interfaces, such as user interface 104 of FIG. 1. The user interface may allow a user (e.g., a human administrator and/or another computer process) to view information regarding multiple virtualized file servers, to communicate with multiple virtualized file servers, to manage multiple virtualized file servers, and generally to offer a single pane of glass interface to the multiple virtualized file servers in communication with the file server manager. The user interface may be implemented, for example, using one or more display(s) and one or more input and/or output device(s) (e.g., mouse, keyboard, touchscreen, etc.). In some examples, user interface 104 of file server manager 102 may be used to depict one or more of the virtualized file server 106, virtualized file server 114, and/or virtualized file server 122. For example, the identity and number of shares used by the virtualized file servers may be displayed. In some examples, the number and identity of computing nodes and/or FSVMs in each of the virtualized file servers may be displayed. Other attributes of the virtualized file servers may additionally or instead be displayed using a user interface of a file server manager. The data used in the display may wholly and/or partially be obtained from the registration information and/or metadata synchronized with one or more of the virtualized file servers.

Examples of file server managers described herein may store registration information, such as registration information 144 of FIG. 1. The registration information 144 may include information regarding each virtualized file server in communication with the file server manager. The registration information may include information used to manage, communicate with, and/or otherwise interact with the virtualized file server. Examples of registration information include a name of the virtualized file server, an identification of the virtualization environment hosting the virtualized file server, credentials for one or more FSVMs in the virtualized file server, IP addresses or other addresses for the virtualized file server, FSVMs in the virtualized file server, or other components of the virtualized file server. During setup of a system including a file server manager, the virtualized file servers may be registered with the file server manager, and may provide registration information to the file server manager. The registration information may be stored by the file server manager, such as in registration information 144, which may be a database in some examples. The registration information may be stored on a memory and/or other storage device accessible to the file server manager.

Examples of file server managers described herein may include metadata, such as metadata 136. The metadata may be synchronized to the metadata of multiple virtualized file servers in communication with the file server manager. For example, the metadata 136 may be synchronized with metadata 138, metadata 140, and metadata 142. For example, the metadata 136 at any given time may include metadata 138, metadata 140, and metadata 142. Synchronization may be maintained over time—the metadata of multiple virtualized file servers may periodically (e.g., at regular and/or irregular intervals) synchronize with the metadata store of the file server manager. In this manner, the file server manager 102 may maintain an updated storage of metadata associated with each of virtualized file server 106, virtualized file server 114, and virtualized file server 122. The metadata may be accessed by the file server manager and used to manage, communicate with, and/or otherwise interact with the virtualized file servers.

While the metadata 136 and registration information 144 are depicted separately in FIG. 1, they may be wholly and/or partially stored on a same storage device in some examples. The metadata 136 may be stored, for example, in a database. The registration information 144 may be stored, for example, in a database. Any of a variety of database synchronization techniques may be used to synchronize the metadata of the file server manager with the metadata of multiple virtualized file servers.

During operation, a file server manager described herein may register, such as by receiving a registration for, one or more virtualized file servers. For example, a virtualized file server (e.g., using an FSVM, a hypervisor, and/or another component of the virtualized file server), may transmit a registration (e.g., registration information) to the file server manager. In some examples, the file server manager may request such a registration by transmitting a request to register to the virtualized file server. In some examples, such as when the file server manager is hosted on a cluster and/or within a same system as the virtualized file server, an automatic registration may occur. For example, the registration process may include determining (e.g., from one or more IP addresses used), that a virtualized file server is hosted on a same domain as a file server manager. In other examples, virtualized file servers which hare not hosted on a same domain as a file server manger may nonetheless register with the file server manager In the example of FIG. 1, the file server manager 102 may request registration from virtualized file server 106, virtualized file server 114, and virtualized file server 122. For example, a system administrator may enter an IP address, name, or other identifier to request a registration from virtualized file server 106, virtualized file server 114, and/or virtualized file server 122. In some examples, a system administrator or other user or component may transmit a registration from virtualized file server 106, virtualized file server 114, and/or virtualized file server 122, which registration may or may not be responsive to a request. In some examples, the operating system of one or more computing nodes of the virtualized file server hosting an FSVM may provide a registration request to the file server manager. The registration may include registration information which file server manager 102 may store in registration information 144.

The file server manager may synchronize metadata of registered file servers such that up to date metadata of the registered file server may be accessible to the file server manager. For example, the metadata 136 may synchronize with metadata 138, metadata 140, and metadata 142 of FIG. 1. Any and/or all types of metadata of the virtualized file server may be synched with a file server manager. For example, a number and identity of shares of each virtualized file server may be synchronized with the file server manager. In some examples, compute and/or storage resource usage may additionally or instead be synchronized between a virtualized file server and the file server manager. Sharding or other maps and/or portions thereof may be synchronized between a virtualized file server and the file server manager. Other metadata may be synchronized additionally or instead.

During operation, file server managers described herein, such as file server manager 102 of FIG. 1 may receive a management request for a particular virtualized file server. The management request may be received, for example by a client which may be hosted on a client system, on a system also hosting the file server manager, and/or on a system hosting all or a portion of one of the virtualized file servers in communication with the file server manager. In some examples, the management request may be implemented using an API call. In this manner, a file server manager may provide an API endpoint to receive API calls for one or more virtualized file servers. Examples of management requests include requests for accessing, managing, and/or maintaining the virtualized file server. For example, a management request may be a request to add and/or subtract one or more FSVMs, add and/or subtract one or more shares in the storage, and/or upgrade one or more FSVMs.

The file server manager may format the received management request for the virtualization environment (e.g., virtualization platform) used to host the requested virtualized file server. For example, the file server manager may access the registration information 144 to identify a virtualization environment for a virtualized file server identified in the management request. The management request may then be formatted in a manner used by the virtualized environment. In some examples, the formatted management request may be implemented as an API call, with the API call specific to the virtualization environment of the target virtualized file server. In this manner, clients or other users providing management requests to the file server manager may not require knowledge of the virtualized environment hosting the virtualized file server. The file server manager may format the request in the manner used to communicate with the appropriate virtualization environment. This may provide flexibility in system design and usage, as multiple virtualization environments may be used, and virtualized file servers may in some examples be relocated from one virtualized environment to another without a need to update management requests being provided to the file server manager. Instead, an updated identification of the virtualized environment may be stored in registration information 144 and/or metadata 136.

During operation, the file server manager may utilize information from the registration to implement the management request. For example, access credentials provided during registration may be used to access one or more FSVMs and/or other components of the virtualized file server (e.g., hypervisor, other virtual machine(s) and/or container(s)) and implement the management request. In some examples, the management request may be provided to a particular FSVM. In some examples, the management request may be provided to an FSVM of the virtualized file server that is designated as a leader, and the leader FSVM may communicate the management request to an appropriate FSVM of the virtualized file server.

In some examples, file server managers described herein, such as file server manager 102 of FIG. 1, may be used to implement one or more cross-file server policies. A cross-file server policy may generally refer to a policy that accesses and/or utilizes more than one file server in implementing the policy. For example, one virtualized file server may be used (e.g., designated) as a destination file server and another virtualized file server may be used (e.g., designated) as a source file server. For example, the file server manager 102 may designate virtualized file server 106 as a source file server and virtualized file server 114 as a destination file server. The file server manager 102 may then utilize virtualized file server 106 to replicate, backup, provide redundancy for, or otherwise receive data from virtualized file server 106. For example, the file server manager 102 may implement a replication policy from virtualized file server 106 to virtualized file server 114. Without the presence of file server manager 102 in some examples, the virtualized file server 106 may have been used to implement a replication policy to virtualized file server 114 directly. However, utilizing file server manager 102 provides for central cross-server management and avoids a need for individual file servers to communicate with one another directly.

Figure 2:
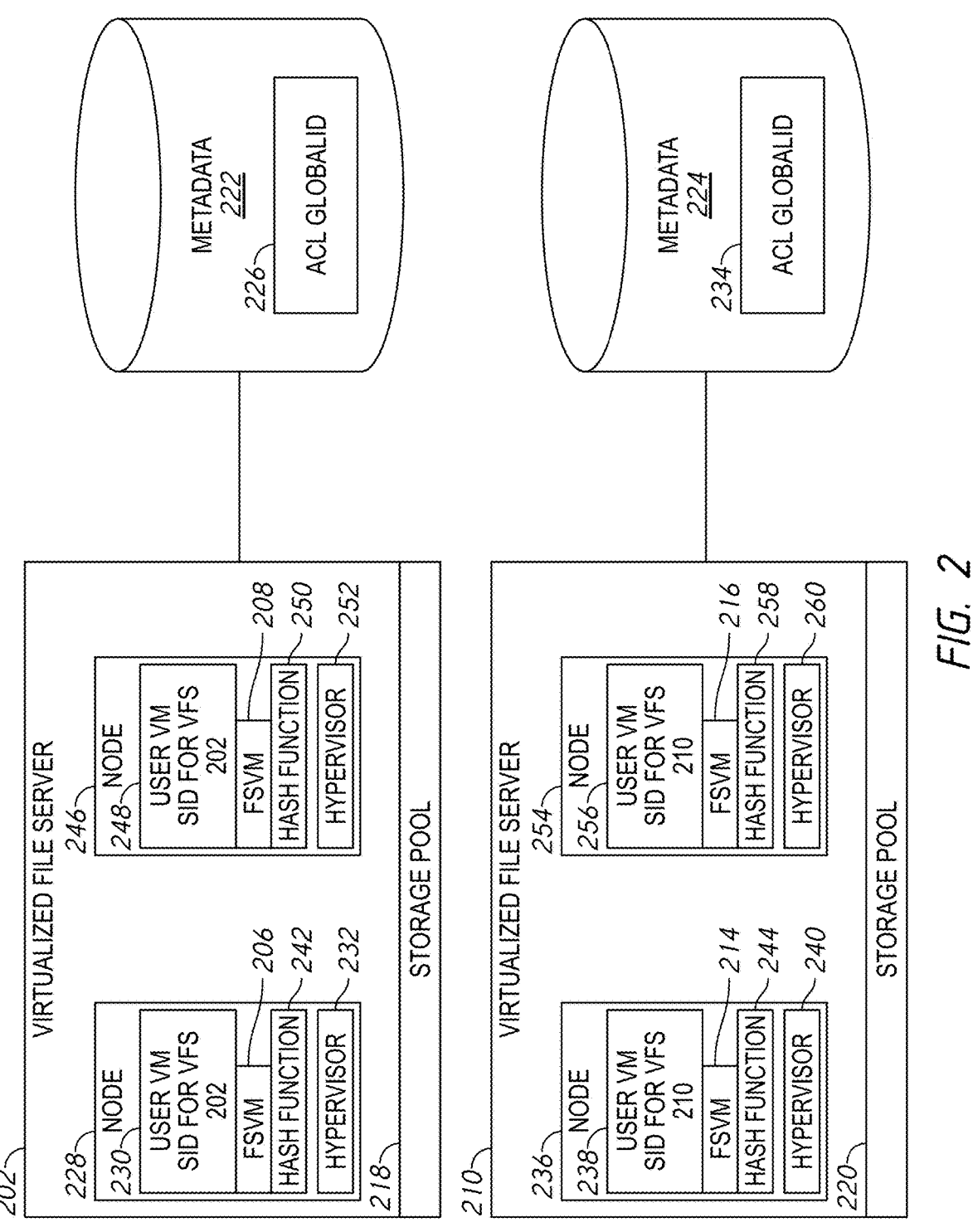
FIG. 2 is a schematic illustration of a system, arranged in accordance with examples described herein.

FIG. 2 is a schematic illustration of a system arranged in accordance with examples described herein. The system of FIG. 2 includes virtualized file server 202 and virtualized file server 210. The virtualized file servers of FIG. 2 may be used to implement and/or may be implemented by any of the virtualized file servers described herein, including those shown and described with reference to FIG. 1. The virtualized file server 202 includes node 228 and node 246, which may each be a computing node. The virtualized file server 202 also includes storage pool 218. As shown in FIG. 2, the node 228 may include user VM 230, FSVM 206, hash function 242, and hypervisor 232. The node 246 may include user VM 248, FSVM 208, hash function 250, and hypervisor 252. It is to be understood that additional and/or alternative FSVMs may be provided by virtualized file server 202, and each additional and/or alternative FSVM may be provided on respective computing nodes also having user VM(s), hash function(s), and hypervisor(s), or combinations thereof. While not shown, additional and/or alternative components may also be provided on the computing nodes.

The virtualized file server 210 includes node 236 and node 254, which may each be a computing node. While only two nodes are shown in FIG. 2, generally three or more nodes may be provided in a virtualized file server. The virtualized file server 210 also includes storage pool 220. The storage pool 220 may include local storage devices of the computing nodes included in the virtualized file server (e.g., node 236 and node 254). Additional storage made also be included in storage pool (e.g., networked storage, cloud storage, other storage devices). As shown in FIG. 2, the node 236 may include user VM 238, FSVM 214, hash function 244, and hypervisor 240. The node 545 may include user VM 256, FSVM 216, hash function 258, and hypervisor 260. It is to be understood that additional and/or alternative FSVMs may be provided on respective computing nodes also having user VM(s), hash function(s), and hypervisor(s), or combinations thereof. While not shown, additional and/or alternative components may also be provided on the computing nodes.

As should be appreciated, the nodes 228 and 246 of the virtualized file server 202 may form a cluster to provide a virtualized file server. The nodes 236 and 254 of virtualized file server 210 may form a cluster to provide a virtualized file server. The virtualized file server 202 may comprise (and/or include) metadata 222. In some examples, metadata 222 may comprise metadata for data stored in the storage pool 218. In some examples, the virtualized file server 210 may comprise (and/or include) metadata 224. In some examples, the metadata 224 may comprise metadata for data stored in the storage pool 220. In some examples, the metadata stored in metadata 222 and/or metadata 224 itself may be stored in (e.g., distributed across) devices in the respective storage pool. In some examples, the metadata 222 may include ACL 226. In some examples, the metadata 224 may include ACL 234. In some examples, ACL 226 may include a local user system identification (SID) and/or global ID. In some examples, metadata 224 may include a local user system identification (SID) and/or global ID. In some examples, the local user SID stored in metadata 222 may be specific to virtualized file server 202. In some examples, the local user SID stored in metadata 224 may be specific to virtualized file server 210. As should be appreciated, additional and/or alternative data and/or metadata used to implement systems and methods described herein may be stored in metadata 222 and/or metadata 224. As should further be appreciated, other additional and/or alternative data and/or metadata may be stored in metadata 222 and/or metadata 224. In some examples, and as should be appreciated, metadata, such as metadata 222 and/or metadata 224 may be associated with one or more files. In some examples, each file may have separate metadata (e.g., a separate ACL) with a different (and/or same) set of SIDs (e.g., local and/or global), as described herein. In some examples, while metadata 222 and metadata 224 are illustrated in FIG. 2 as being associated with and/or coupled to a file server, metadata 222 and/or metadata 224 may be metadata for a file, and may be stored along with each file in a storage pool.

During operation, a local user may be registered with virtualized file server 202. A local user may generally refer to a user who does not have an entry in an Active Directory for the file server, and therefore may not be identified through consulting the Active Directory provided by an operating system of the file server. The local user may, for example, be a user or process that is utilizing and/or accessing the user VM 230 and/or user VM 248. Accordingly, the virtualized file server 202 may assign a local user system identification (e.g., a local user SID) to the local user. The local user SID may be based on an identification of the virtualized file server 202, which is registering the local user. For example, the local user SID may include a prefix, suffix, or other portion, which identifies the virtualized file server 202, or is an indicia representative of virtualized file server 202. In one non-limiting example, a local user SID may be given as SID-1-2-xxx-yyy, where "yyy" is a portion unique for each user, but 'xxx' is a portion specific to the file server.

In some examples, the "yyy" portion may be referred to as an RID. The FSVM 206, FSVM 208, hypervisor 232, hypervisor 252, and/or other components of the virtualized file server 202 and/or node 228 and node 246 may communicate with the local user using the local user SID.

The virtualized file server 202 may additionally and/or alternatively assign a global ID to the local user. In some examples, the global ID may be based on user attributes associated with the user. In some examples, the user attributes may be provided by the user when registering with the virtualized file server 202 and/or may be accessed by the virtualized file server 202 responsive to a request to register the local user. User attributes which may be used to generate the global ID include, but are not limited to, first name, last name, user name, address, city, phone number, quota, department, company, age, or combinations thereof. The virtualized file server 202 may utilize hash function 242 and/or hash function 250 to generate the global ID for the local user. In some examples, the FSVM 206 may utilize hash function 242 to generate the global ID and/or FSVM 208 may utilize hash function 205 to generate the global ID. However, as should be appreciated, other components of the virtualized file server 202 may generate the global ID using the hash function 242 and/or the hash function 250 in other examples, such as the hypervisor 232, hypervisor 252, and/or the user VM 230 itself and/or the VM 248 itself. In some examples, a daemon or other container may be provided to generate the global ID. The global ID may be stored in ACL 226 and associated with the access controls for the local user. The virtualized file server 202 may communicate with the ACL 226 regarding the local user using the global ID.

In this manner, and as further described at least in FIGS. 3A-3E, communication between the virtualized file server 202 and the ACL 226 stored in metadata 222 is conducted using a global ID based on user attributes and not based on virtualized file server 202 identity. In some examples, communication between the virtualized file server 202 and the local user may continue to occur based on the local user SID, which in some examples may be based on the identity of the virtualized file server 202. Generally, an ACL may refer to a set of ACEs (Access Control Entries). Each ACE may include a local user SID and the access rights for the local user SID on the file/directory. In examples described herein, a global ID (rather than a local user SID specific to the file server) may be used in (e.g., stamped in) the ACEs of the ACL. In some examples, the ACL may be maintained by the file system protocol, e.g., by the server message block (SMB) server (e.g., one or more FSVMs). As should be appreciated, other protocols may be used to maintain the ACL.

In some examples, data from virtualized file server 202 (e.g., from storage pool 218) may be migrated, duplicated, and/or moved to virtualized file server 210. In some examples, the migration, duplication, or other movement of data may occur as a result of a disaster, a planned migration, or other reason. In some examples, the movement of data may be controlled by virtualized file server 202, by a file server manager described herein (e.g., such as file server manager 102 of FIG. 1), by an administrative (e.g., admin) system, and/or by other component(s). In some examples, when the data is moved, which may occur by block level replication, the ACL 226 (and/or files or other data implicated by the ACL 336) may be copied, replicated, and/or moved to metadata 224 of virtualized file server 210 (e.g., ACL 234 may be a copy of ACL 226). Accordingly, the global ID for the local user remains in ACL 234.

In some examples, when the same local user contacts virtualized file server 210 to access data, the local user may be registered with the virtualized file server 210. The virtualized file server 210 may assign the local user a local user SID specific for the virtualized file server 210. As described herein, the local user SID may contain a prefix, suffix, or other portion that identifies or is specific to the virtualized file server 210. Note that the local user SID assigned by virtualized file server 210 will be different from the local user SID assigned to the local user by virtualized file server 202. For example, recall that the local user may be assigned a local user SID, such as SID-1-2-xxx-yyy, from virtualized file server 202, e.g., at registration. In some examples, virtualized file server 210 may assign that same local user local user SID, such as SID-1-2-aaa-yyy, e.g., at registration. Recall that in some examples, the "xxx" and "aaa" portions may be specific to the virtualized file server, and the "yyy" portion may be specific to the local user.

Additionally and/or alternatively to the local user SID, the virtualized file server 210 may also assign the local user a global ID using hash function 244 and/or has function 258. In some examples, hash function 244 and the hash function 258, are the same hash functions as hash function 242 and hash function 250. Accordingly, the virtualized file server 210 will generate the same global ID for the same local user based on local user attributes, and not based on file server identification. In some examples, the virtualized file server 210 may communicate with the local user using the local user SID, but may communicate with the storage and determine access control for the local user based on global ID. Accordingly, the virtualized file server 210 will access the ACL 234 based on the global ID to determine access control for the local user, and the determined access control will accordingly be the same and accurate as was established by the virtualized file server 202.

Operationally, and in some examples, each file server (e.g., virtualized file server 202, virtualized file server 210, etc.) may store a mapping between the local user SID of local users registered with the file server and the global IDs of those local users. The mapping may be stored in a database hosted by and/or accessible to the file server, which may be a distributed database. For example, the virtualized file server 202 may have a database of local user SID that map to (e.g., <-->) global ID mappings. In some examples, and as described herein at least in FIGS. 3A-3E, the virtualized file server 202 may use the mapping database to translate global ID to local user SID and back again when communicating internally (with the global ID) versus communicating externally outside of the file server (with the local user SID). Multiple mappings may be stored by the virtualized file server to aid in different conversions, which may be desirable during operation.

For example, a mapping may be stored between RID (e.g., component of the local user SID, such as the "yyy" component in the above-described example) and/or the entire local user SID and a user name. Another mapping may be stored between the user name and user information (e.g., a UID and/or external SID). Another mapping may be stored between external SID and a user name. Another mapping may be stored between a user ID and a user name. Another mapping may be stored between SID and/or RID and global ID. As should be appreciated, any and/or all of these mappings may be stored, as well as additional and/or alternative mappings may be stored and are contemplated to be within the scope of this disclosure. In some examples, the global ID (e.g., the global ID that was translated from the local user SID) may be matched to the ACL to determine access to the file for the user at the second file server.

In one non-limiting example, a first file server may generate a first local user SID and a global ID for user A, a user of the first file server. The first local user SID may be specific to the first file server, while the global ID may be generated via a hash function using attributes of user A. In some examples, the virtualized file server may generate the global ID based on user A's name, though other user attributes may be used. In some examples, the local user SID and/or the global ID for user A may be used during access and authentication requests. The local user SID and/or the global ID for user A may be stamped in (e.g., stored) in an ACL that in some examples may include and/or comprise control and/or authentication information for user A. In some examples, data from the first file server may be migrated and/or replicated, etc. from the first file server to a second file server. Continuing with this example, upon registering with the second file server, user A may in some examples be assigned a second local user SID specific to the second file server, as well as a global ID specific to user A based on user attributes using a hash function. In this example, upon receiving an access request from user A to access the data (e.g., files, etc.) on the second file server and migrated from the first file server, the second file server will map the second local user SID for user A to the global ID for user A. Using this mapping, the second file server may in some examples determine access to the data for user A. in some examples, the determination may be based on a matching, such as matching the global ID to the ACL to determine access to the file for the user.

As should be appreciated, in some examples, virtualized file server 202 may comprise a cluster of nodes, such as nodes 228 and 246. In some examples, each node in the cluster may be a computing node. In some examples, virtualized file server 210 may comprise a cluster of nodes, such as nodes 236 and 254. In some examples, each node in the cluster may also be a computing node. In some examples, the cluster of nodes in virtualized file server 202 may be configured to provide a distributed file system. In some examples, the cluster of nodes in virtualized file server 210 may also be configured to provide the same and/or a different distributed file system. In some examples, the file servers described herein may comprise nodes, where each node of the cluster of computing nodes comprises one or more file server virtual machines (FSVMs). In some examples, the FSVMs in the cluster of computing nodes may be configured to present a single namespace of storage items distributed across a storage pool. In some examples, the storage pool may include local storage devices of the cluster of nodes (e.g., of the cluster of computing nodes).

Turning now to FIGS. 3A-3E, FIG. 3A is a flowchart for an external SID (e.g., local user SID) to internal global ID conversion arranged in accordance with examples described herein.

Recall that, in some examples, a user may wish to access a file (e.g., a file migrated from a source file server) at a destination file server. Here, the user may interact with the destination file server using a local user ID specific to the destination file server, but the destination file server may determine access using the user's global ID specific to the user. As such, and in some examples, an external SID (e.g., a local user SID) may be received in block 302. In some examples, the local user SID may be provided by, e.g., one or more user VMs, other virtualized file servers, file managers, admin systems, or other components associated with a request to a virtualized file server (e.g., to an FSVM or other component of a virtualized file server).

In some examples, to determine access to the requested file, the destination file server must convert (e.g., translate, map, etc.), the received local user SID to a global ID. In some examples, and at block 304, the virtualized file server may look up a name entry associated with the received local user SID (e.g., associated with the RID portion of the SID). The virtualized file server may access a mapping between SID and/or RID and user name. However, as should be appreciated, the virtualized file server may additionally and/or alternatively access a mapping between the local user SID and/or RID and a first name, last name, user name, address, city, phone number, quota, department, company, age, or combinations thereof.

In block 306, the virtualized file server may look up user information associated with the user name determined in block 304. For example, the virtualized file server (e.g., one or more FSVMs or other component of the virtualized file server, such as FSVM 214 of node 236 and/or FSVM 216 of node 254, both of virtualized file server 210) may access a mapping between user information and user name. In some examples, the mapping may be stored in a database communicatively coupled to the file server, storage pool 220, and/or in metadata, such as metadata 224 of FIG. 2. As should be appreciated, the mapping may be stored in additional and/or alternative storage. The user information may include one or more attributes of a user (e.g., full name, first name, last name, UID, quota, address, city, country, etc.).

In block 308, the virtualized file server may return a global ID (e.g., a local user SID) associated with that user information. In this manner, a global ID (internal SID) may be returned responsive to receipt of a local user's local user SID. The global ID may be used to access one or more ACLs and determine access control information and/or authentication for a user. The internal ACLs may be used to store the ACL on disk. In some examples, the process of FIG. 3A may be used to convert external ACLs to internal ACLs prior to storing the ACL to disk. When using block level replication to move data to another virtualized file server, the ACL including local user SIDs (e.g., global IDs) may be replicated to the destination file server.

In some examples, and as described herein, a security token may be generated when the user logs in. In some examples, the security token may include and/or comprise the global ID of the user.

In some the examples, the global ID in the security token may be used to evaluate access rights of the user to one or more resources (e.g., files, directories, and the like). In some examples, the evaluation may be based on a comparison of the global ID to the ACEs stored in the ACL in the metadata of the file and/or directory.

FIG. 3B is a flowchart for an internal SID (e.g., global ID) to external SID (e.g., local user SID) conversion arranged in accordance with examples described herein.

In block 310, an internal SID (e.g., a global ID) is provided. For example, an internal SID may be provided by a virtualized file server when accessing an ACL and/or when returning accessed files or other data based on a global ID. For example, upon a user of a virtualized file server requesting access to a file, the virtualized file server may use the internal SID to determine access to that file. In some examples, the internal SID may be used to determine authentication and/or other access controls, and the like.

In block 312, a user name may be looked up (e.g., using stored mappings as described herein) based on the internal SID or global ID. In some examples, the mapping may be stored in a database or other storage, such as, for example, storage pool 218 and/or metadata 222 of FIG. 2. For example, a virtualized file server (e.g., one or more FSVMs) may access a mapping to return user information, e.g., a user name, based on the SID received in block 310.

In block 314, user information (e.g., user attributes) may be looked up based on the user name determined in block 312. For example, a virtualized file server (e.g., one or more FSVMs or other components, such as virtualized file server 202 of FIG. 2) may access a mapping to return user information based on the user name. In some examples, the mapping may be stored in a database or other storage, such as, for example, storage pool 218 and/or metadata 222 of FIG. 2. As should be appreciated, and as described herein, in some examples, the user information may include one or more attributes of a user, such as but not limited to, full name, first name, last name, UID, quota, address, city, country, and the like.

In block 316, an external SID may be provided by a virtualized file server based on the user information. For example, a virtualized file server (e.g., one or more FSVMs or other components, such as virtualized file server 202 of FIG. 2) may access a mapping to return an external SID based on user attributes and/or user name determined in block 312 and/or block 314. In some examples, and as described herein, a user may communicate with a virtualized file server using a local user SID, the virtualized file server may determine access using a global ID, and upon making an access (and/or other determination), the virtualized file server may provide access and/or another output to the user using the local user ID. As such, the external SID identified in block 316 may be used to communicate with the local user and/or other systems or components external to the virtualized file server.

FIG. 3C is a flowchart for an ACL update arranged in accordance with examples described herein.

In some examples, a client may provide an ACL with external SIDs, as illustrated in block 318. Recall, in some examples, users of a virtualized file server (e.g., registered users) may be assigned both a local user ID specific to the file server, and a global ID based on user attributes via a hash function. In some examples, an ACL with external SIDs (e.g., local user SIDs) may sometimes have been stored in metadata 222 and/or metadata 224 of FIG. 2. In some examples, a global ID may not have been used or assigned to a user of the virtualized file system.

In some examples, and as illustrated in block 320, an ACL using internal SIDs may be provided based, in some examples, on a conversion of the local user SID to a global ID. For example, the virtualized file server may convert the external SIDs specific to the virtualized file server into global IDs (e.g., internal IDs) using the process described with reference to FIG. 3A and/or other mappings as described at least in FIG. 2. The ACL using the global IDs may then be stored to the metadata associated with the file system as shown in metadata 322 (and/or as also stored in metadata 222 and 224 of FIG. 2). For example, the ACL 226 and/or ACL 234 of FIG. 2 may be stored in this manner. In some examples, the process of FIG. 3C may allow existing ACLs stored and maintained with external SIDs specific to the file server to be converted into ACLs ready to be migrated to other file servers. In this way, a user can access data migrated to a destination file server based by interacting with the destination file server using the user's local user SID, while the destination file server determines access using the user's global ID, converted from the user's local user SID.

Figure 3D:
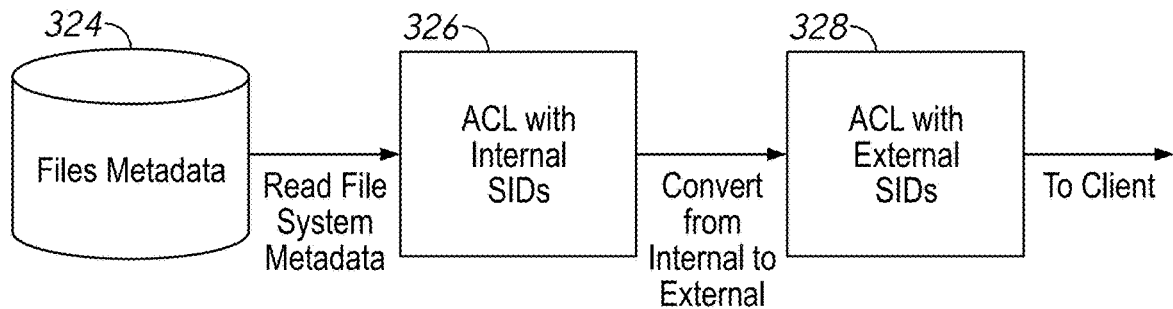
FIG. 3D is a flowchart for an ACL retrieval process, arranged in accordance with examples described herein.

FIG. 3D is a flowchart for an ACL retrieval process arranged in accordance with examples described herein.

Recall that, in some examples, a user may communicate and/or interact with a virtualized file server (e.g., a destination file server, a source file server, etc.) using the user's local user SID, while the virtualized file sever may determines access using the user's global ID. In some examples, once an access and/or authentication is determined, the virtualized file server may need to continue communication with the user. Accordingly, and in some examples, metadata 324 may be stored and may utilize internal SIDs (e.g., global SIDs). The metadata 324 may be used to implement and/or may be implemented by metadata 322 of FIG. 3C, and/or metadata 222 or metadata 224 of FIG. 2.

In some examples, the metadata 324 may be read in block 326 (e.g., an FSVM or other component of a virtualized file server may access the 324). The ACL with internal SIDs may be obtained in block 326. As described, the virtualized file server may determine access using the user's global ID (e.g., internal ID).

In some examples, and in block 328, the ACL with internal SIDs may be converted to an ACL with external SIDs by replacing the internal SIDs with external SIDs. For example, the process shown in FIG. 3B may be used to convert the internal SIDs to external SIDs. The ACL with external SIDs may be provided to a client (e.g., a local user and/or other component external to a file server). In this way, the virtualized file server may, in some examples, be able to determine access and/or authentication, as well as provide an ACL including the file server specific SIDs to the user.

Figure 3E:
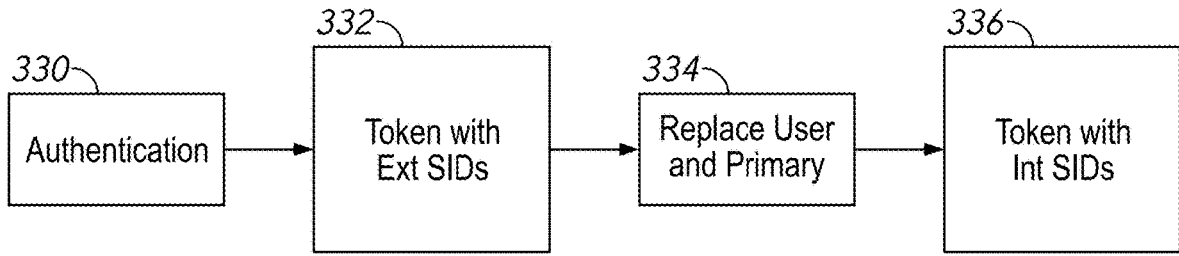
FIG. 3E is a flowchart for access and/or authentication check, arranged in accordance with examples described herein.

FIG. 3E is a flowchart for access and/or authentication check arranged in accordance with examples described herein.

In some examples, and as described herein, a local user may be authenticated in block 330. For example, a virtualized file server and/or other virtualized environment may authenticate a local user. The authentication process may result in a token 332, which contains an external SID (e.g., an ID specific to the file server). In some examples, the external ID contained within the token 332 may present as SID-1-2-xxx-yyy, where the "xxx" portion is file server specific, and the "yyy" portion is user specific.

In block 334, the userID may be replaced, such as by looking up the global ID associated with the external SID in a process such as described with reference to FIG. 3A and or other figures, such as FIG. 2. The replacement process in block 334 may result in a token 336 including the internal SID (e.g., the global ID). The token 336 may be used to interact with internal portions of the file server (e.g., with one or more ACLs). In this way, the token 332 may include the local user SID the user may use to communicate with the virtualized file server, and the token 336 may be used by the virtualized file sever to determine access and/or authentication. As part of the flow for access (and/or authentication) check, and as described herein, in block 334, the local SID (that in some examples may be file server specific), may be replaced with a global ID in the token. In this way, the token 336 may be used to interact with the internal portions of the file server (e.g., with one or more ACLs) using the global ID.

As should be appreciated, and as described herein, examples of systems and methods described herein may include a file server manager in communication with one or more virtualized file servers. In some examples, the file server manager may be and/or include the functionality of file server manager 102 of FIG. 1. In some examples, examples of virtualized file servers which may be used to implement virtualized file servers described in, for example, U.S. Published Patent Application 2017/0235760, entitled "Virtualized file server," published Aug. 17, 2017 on U.S. application Ser. No. 15/422,220, filed Feb. 1, 2017, both of which documents are hereby incorporated by reference in their entirety for any purpose.

Figure 4:
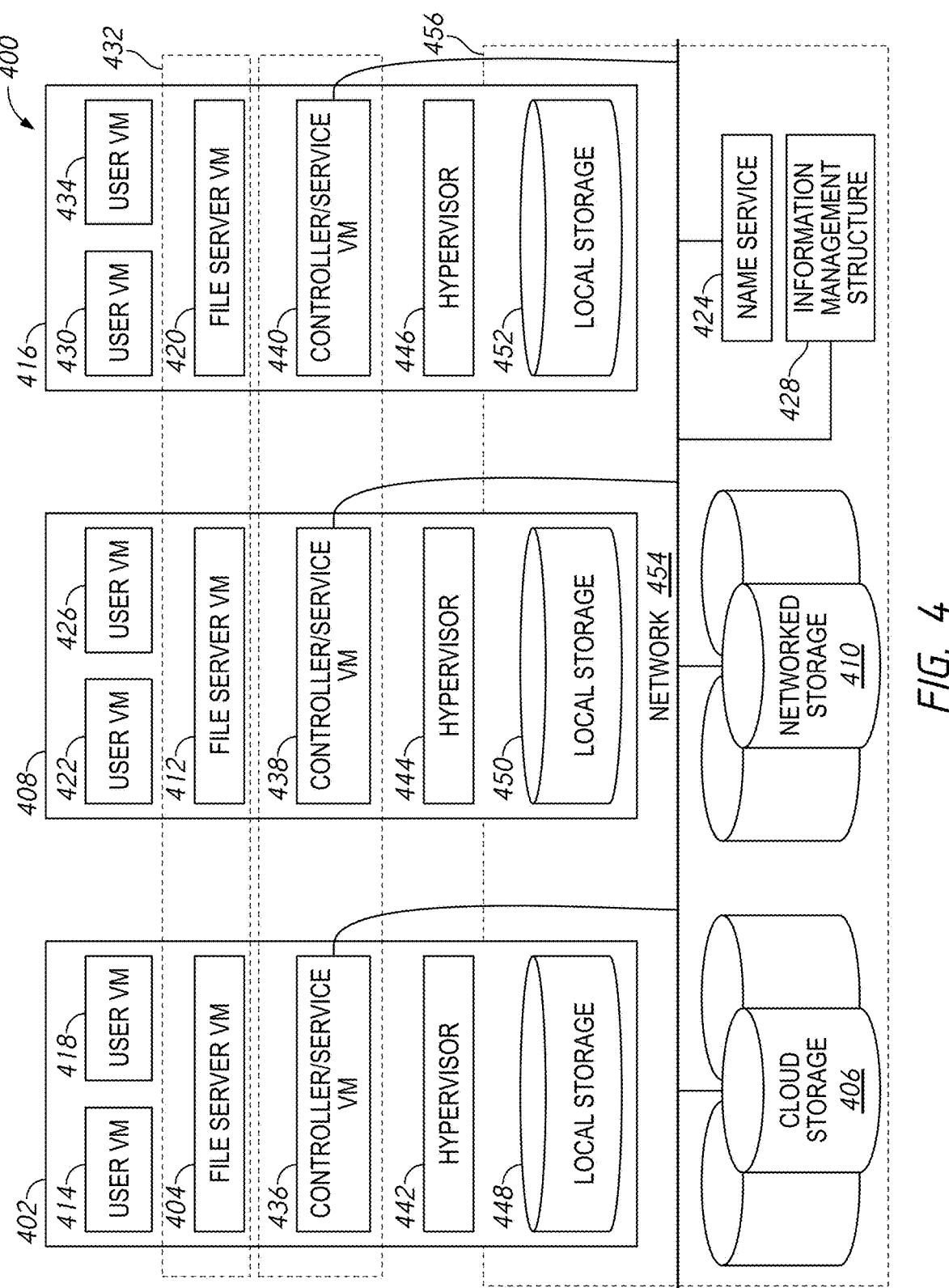
FIG. 4 is a schematic illustration of a clustered virtualization environment 400 implementing a virtualized file server, arranged in accordance with examples described herein.

FIG. 4 is a schematic illustration of a clustered virtualization environment 400 implementing a virtualized file server (VFS 432) according to particular embodiments. In particular embodiments, the VFS 432 provides file services to user VMs 414, 418, 422, 426, 430, and 434. Each user VM may be a client as used herein. The file services may include storing and retrieving data persistently, reliably, and efficiently. The user virtual machines may execute user processes, such as office applications or the like, on host machines 402, 408, and 416. The stored data may be represented as a set of storage items, such as files organized in a hierarchical structure of folders (also known as directories), which can contain files and other folders, and shares, which can also contain files and folders.

The clustered virtualization environment 400 and/or VFS 432 may be used to implement one or more virtualization platforms and/or virtualized file servers described herein, such as the virtualized file server 106, virtualized file server 114, and/or virtualized file server 122 of FIG. 1 and/or the virtualized file server 202 and/or virtualized file server 210 of FIG. 2 and/or any other virtualized file server described herein.

The architectures of FIG. 4 can be implemented for a distributed platform that contains multiple host machines 402, 416, and 408 that manage multiple tiers of storage. The multiple tiers of storage may include storage that is accessible through network 454, such as, by way of example and not limitation, cloud storage 406 (e.g., which may be accessible through the Internet), network-attached storage 410 (NAS) (e.g., which may be accessible through a LAN), or a storage area network (SAN). Examples described herein also permit local storage 448, 450, and 452 that is incorporated into or directly attached to the host machine and/or appliance to be managed as part of storage pool 456. Examples of such local storage include Solid State Drives (henceforth "SSDs"), Hard Disk Drives (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 456. Virtual disks (or "vDisks") may be structured from the physical storage devices in storage pool 456. As used herein, the term vDisk refers to the storage abstraction that is exposed by a component of the virtualization platform, such as a Controller/Service VM (CVM) (e.g., CVM 436) and/or a hypervisor or other storage controller to be used by a user VM (e.g., user VM 414). In particular embodiments, the vDisk may be exposed via iSCSI ("internet small computer system interface") or NFS ("network filesystem") and is mounted as a virtual disk on the user VM. In particular embodiments, vDisks may be organized into one or more volume groups (VGs).

Each host machine 402, 416, 408 may run virtualization software, such as VMWARE ESX (I), MICROSOFT HYPER-V, or REDHAT KVM. The virtualization software includes hypervisors 442, 444, and 446 to create, manage, and destroy user VMs, as well as managing the interactions between the underlying hardware and user VMs. User VMs may run one or more applications that may operate as "clients" with respect to other elements within clustered virtualization environment 400. A hypervisor may connect to network 454. In particular embodiments, a host machine 402, 408, or 416 may be a physical hardware computing device; in particular embodiments, a host machine 402, 408, or 416 may be a virtual machine.

CVMs 436, 438, and 440 are used to manage storage and input/output ("I/O") activities according to particular embodiments. These special VMs act as the storage controller in the currently described architecture. Multiple such storage controllers may coordinate within a cluster to form a unified storage controller system. CVMs may run as virtual machines on the various host machines, and work together to form a distributed system that manages all the storage resources, including local storage, network-attached storage 410, and cloud storage 406. The CVMs may connect to network 454 directly, or via a hypervisor. Since the CVMs run independent of hypervisors 442, 444, 446, this means that the current approach can be used and implemented within any virtual machine architecture, since the CVMs of particular embodiments can be used in conjunction with any hypervisor from any virtualization vendor. In some examples, CVMs may not be used and one or more hypervisors (e.g., hypervisors 442, 444, and/or 446) may perform the functions described with respect to the CVMs. In some examples, one or more CVMs may not be present, and the hypervisor or other component hosted on the computing nodes may provide the functions attributed to the CVM herein.

A host machine may be designated as a leader node within a cluster of host machines. For example, host machine 408, may be a leader node. A leader node may have a software component designated to perform operations of the leader. For example, CVM 438 on host machine 408 may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node and/or in communication with the leader node or virtual machines or containers on the leader node. For example, file server managers described herein may be in communication with the leader node in some examples.

Each CVM 436, 438, and 440 exports one or more block devices or NFS server targets that appear as disks to user VMs 414, 418, 422, 426, 430, and 434. These disks are virtual, since they are implemented by the software running inside CVMs 436, 438, and 440. Thus, to user VMs, CVMs appear to be exporting a clustered storage appliance that contains some disks. All user data (including the operating system) in the user VMs may reside on these virtual disks.

Significant performance advantages can be gained by allowing the virtualization system to access and utilize local storage 448, 450, and 452 as disclosed herein. This is because I/O performance is typically much faster when performing access to local storage as compared to performing access to network-attached storage 410 across a network 454. This faster performance for locally attached storage can be increased even further by using certain types of optimized local storage devices, such as SSDs. Further details regarding methods and mechanisms for implementing the virtualization environment illustrated in FIG. 4 are described in U.S. Pat. No. 8,601,473, which is hereby incorporated by reference in its entirety.

As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 456. Additionally or alternatively, CVMs 436, 438, 440 may present an emulated storage controller either to the hypervisor or to user VMs to facilitate I/O operations. CVMs 436, 438, and 440 may be connected to storage within storage pool 456. CVM 436 may have the ability to perform I/O operations using local storage 448 within the same host machine 402, by connecting via network 454 to cloud storage 406 or network-attached storage 410, or by connecting via network 454 to local storage 450 or 452 within another host machine 408 or 416 (e.g., via connecting to another CVM 438 or 440). In particular embodiments, any suitable computing system may be used to implement a host machine.

In particular embodiments, the VFS 432 may include a set of File Server Virtual Machines (FSVMs) 404, 412, and 420 that execute on host machines 402, 408, and 416 and process storage item access operations requested by user VMs executing on the host machines 402, 408, and 416. The FSVMs 404, 412, and 420 may communicate with storage controllers provided by CVMs 436, 444, 440 and/or hypervisors executing on the host machines 402, 408, 416 to store and retrieve files, folders, SMB shares, or other storage items on local storage 448, 450, 452 associated with, e.g., local to, the host machines 402, 408, 416. The FSVMs 404, 412, 420 may store and retrieve block-level data on the host machines 402, 408, 416, e.g., on the local storage 448, 450, 452 of the host machines 402, 408, 416. The block-level data may include block-level representations of the storage items (e.g., files). The network protocol used for communication between user VMs, FSVMs, and CVMs via the network 454 may be Internet Small Computer Systems Interface (iSCSI), Server Message Block (SMB), Network Filesystem (NFS), pNFS (Parallel NFS), or another appropriate protocol.

For the purposes of VFS 432, host machine 416 may be designated as a leader node within a cluster of host machines. In this case, FSVM 420 on host machine 416 may be designated to perform such operations. A leader may be responsible for monitoring or handling requests from FSVMs on other host machines throughout the virtualized environment. If FSVM 420 fails, a new leader may be designated for VFS 432.

In particular embodiments, the user VMs may send data to the VFS 432 (e.g., to the FSVMs) using write requests, and may receive data from it using read requests. The read and write requests, and their associated parameters, data, and results, may be sent between a user VM and one or more file server VMs (FSVMs) located on the same host machine as the user VM or on different host machines from the user VM. The read and write requests may be sent between host machines 402, 408, 416 via network 454, e.g., using a network communication protocol such as iSCSI, CIFS, SMB, TCP, IP, or the like. When a read or write request is sent between two VMs located on the same one of the host machines 402, 408, 416 (e.g., between the user VM 414 and the FSVM 404 located on the host machine 402), the request may be sent using local communication within the host machine 402 instead of via the network 454. As described above, such local communication may be substantially faster than communication via the network 454. The local communication may be performed by, e.g., writing to and reading from shared memory accessible by the user VM 414 and the FSVM 404, sending and receiving data via a local "loopback" network interface, local stream communication, or the like.

In particular embodiments, the storage items stored by the VFS 432, such as files and folders, may be distributed amongst multiple FSVMs 404, 412, 420. In particular embodiments, when storage access requests are received from the user VMs, the VFS 432 identifies FSVMs 404, 412, 420 at which requested storage items, e.g., folders, files, or portions thereof, are stored, and directs the user VMs to the locations of the storage items. The FSVMs 404, 412, 420 may maintain a storage map, such as a sharding map, that maps names or identifiers of storage items to their corresponding locations. The storage map may be a distributed data structure of which copies are maintained at each FSVM 404, 412, 420 and accessed using distributed locks or other storage item access operations. Alternatively, the storage map may be maintained by an FSVM at a leader node such as the FSVM 420, and the other FSVMs 404 and 412 may send requests to query and update the storage map to the leader FSVM 420. Other implementations of the storage map are possible using appropriate techniques to provide asynchronous data access to a shared resource by multiple readers and writers. The storage map may map names or identifiers of storage items in the form of text strings or numeric identifiers, such as folder names, files names, and/or identifiers of portions of folders or files (e.g., numeric start offset positions and counts in bytes or other units) to locations of the files, folders, or portions thereof. Locations may be represented as names of FSVMs, e.g., "FSVM-1", as network addresses of host machines on which FSVMs are located (e.g., "ip-addr1" or 128.1.1.10), or as other types of location identifiers.

When a user application executing in a user VM 414 on one of the host machines 402 initiates a storage access operation, such as reading or writing data, the user VM 414 may send the storage access operation in a request to one of the FSVMs 404, 412, 420 on one of the host machines 402, 408, 416. A FSVM 412 executing on a host machine 408 that receives a storage access request may use the storage map to determine whether the requested file or folder is located on the FSVM 412. If the requested file or folder is located on the FSVM 412, the FSVM 412 executes the requested storage access operation. Otherwise, the FSVM 412 responds to the request with an indication that the data is not on the FSVM 412, and may redirect the requesting user VM 414 to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM 404 by sending a file service operation that creates the file or folder to a CVM 436 and/or hypervisor 442 associated with (e.g., located on the same host machine as) the FSVM 404. The CVM 436 subsequently processes file service commands for that file for the FSVM 404 and sends corresponding storage access operations to storage devices associated with the file. The CVM 436 may associate local storage 448 with the file if there is sufficient free space on local storage 448. Alternatively, the CVM 436 may associate a storage device located on another host machine 402, e.g., in local storage 450, with the file under certain conditions, e.g., if there is insufficient free space on the local storage 448, or if storage access operations between the CVM 436 and the file are expected to be infrequent. Files and folders, or portions thereof, may also be stored on other storage devices, such as the network-attached storage (NAS) network-attached storage 410 or the cloud storage 406 of the storage pool 456.

In particular embodiments, a name service 424, such as that specified by the Domain Name System (DNS) Internet protocol, may communicate with the host machines 402, 408, 416 via the network 454 and may store a database of domain name (e.g., host name) to IP address mappings. The domain names may correspond to FSVMs, e.g., fsvm1.domain.com or ip-addr1.domain.com for an FSVM named FSVM-1. The name service 424 may be queried by the user VMs to determine the IP address of a particular host machine 402, 408, 416 given a name of the host machine, e.g., to determine the IP address of the host name ip-addr1 for the host machine 402. The name service 424 may be located on a separate server computer system or on one or more of the host machines 402, 408, 416. The names and IP addresses of the host machines of the VFS 432, e.g., the host machines 402, 408, 416, may be stored in the name service 424 so that the user VMs may determine the IP address of each of the host machines 402, 408, 416, or FSVMs 404, 412, 420. The name of each VFS instance, e.g., each file system such as FS1, FS2, or the like, may be stored in the name service 424 in association with a set of one or more names that contains the name(s) of the host machines 402, 408, 416 or FSVMs 404, 412, 420 of the VFS instance VFS 432. The FSVMs 404, 412, 420 may be associated with the host names ip-addr1, ip-addr2, and ip-addr3, respectively. For example, the file server instance name FS1.domain.com may be associated with the host names ip-addr1, ip-addr2, and ip-addr3 in the name service 424, so that a query of the name service 424 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 424 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs may be balanced across the host machines, since the user VMs submit requests to the name service 424 for the address of the VFS instance for storage items for which the user VMs do not have a record or cache entry, as described below.

In particular embodiments, each FSVM may have two IP addresses: an external IP address and an internal IP address. The external IP addresses may be used by SMB/CIFS clients, such as user VMs, to connect to the FSVMs. The external IP addresses may be stored in the name service 424. The IP addresses ip-addr1, ip-addr2, and ip-addr3 described above are examples of external IP addresses. The internal IP addresses may be used for iSCSI communication to CVMs and/or hypervisors, e.g., between the FSVMs 404, 412, 420 and the CVMs 436, 444, 440 and/or hypervisors 442, 444, and/or 446. Other internal communications may be sent via the internal IP addresses as well, e.g., file server configuration information may be sent from the CVMs to the FSVMs using the internal IP addresses, and the CVMs may get file server statistics from the FSVMs via internal communication as needed.

Since the VFS 432 is provided by a distributed set of FSVMs 404, 412, 420, the user VMs that access particular requested storage items, such as files or folders, do not necessarily know the locations of the requested storage items when the request is received. A distributed file system protocol, e.g., MICROSOFT DES or the like, is therefore used, in which a user VM 414 may request the addresses of FSVMs 404, 412, 420 from a name service 424 (e.g., DNS). The name service 424 may send one or more network addresses of FSVMs 404, 412, 420 to the user VM 414, in an order that changes for each subsequent request. These network addresses are not necessarily the addresses of the FSVM 412 on which the storage item requested by the user VM 414 is located, since the name service 424 does not necessarily have information about the mapping between storage items and FSVMs 404, 412, 420. Next, the user VM 414 may send an access request to one of the network addresses provided by the name service, e.g., the address of FSVM 412. The FSVM 412 may receive the access request and determine whether the storage item identified by the request is located on the FSVM 412. If so, the FSVM 412 may process the request and send the results to the requesting user VM 414. However, if the identified storage item is located on a different FSVM 420, then the FSVM 412 may redirect the user VM 414 to the FSVM 420 on which the requested storage item is located by sending a "redirect" response referencing FSVM 420 to the user VM 414. The user VM 414 may then send the access request to FSVM 420, which may perform the requested operation for the identified storage item.

A particular virtualized file server, such as VFS 432, including the items it stores, e.g., files and folders, may be referred to herein as a VFS "instance" and/or a file system and may have an associated name, e.g., FS1, as described above. Although a VFS instance may have multiple FSVMs distributed across different host machines, with different files being stored on FSVMs, the VFS instance may present a single name space to its clients such as the user VMs. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs may access the data stored on a distributed VFS instance via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients such as user VMs by name, e.g., "\Folder-1\File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance by specifying the file names or path names, e.g., the path name "\Folder-1\File-1", in storage access operations. If the storage items are stored on a share (e.g., a shared drive), then the share name may be used to access the storage items, e.g., via the path name "\\Share-1\Folder-1\File-1" to access File-1 in folder Folder-1 on a share named Share-1.

In particular embodiments, although the VFS instance may store different folders, files, or portions thereof at different locations, e.g., on different FSVMs, the use of different FSVMs or other elements of storage pool 456 to store the folders and files may be hidden from the accessing clients. The share name is not necessarily a name of a location such as an FSVM or host machine. For example, the name Share-1 does not identify a particular FSVM on which storage items of the share are located. The share Share-1 may have portions of storage items stored on three host machines, but a user may simply access Share-1, e.g., by mapping Share-1 to a client computer, to gain access to the storage items on Share-1 as if they were located on the client computer. Names of storage items, such as file names and folder names, are similarly location-independent. Thus, although storage items, such as files and their containing folders and shares, may be stored at different locations, such as different host machines, the files may be accessed in a location-transparent manner by clients (such as the user VMs). Thus, users at client systems need not specify or know the locations of each storage item being accessed. The VFS may automatically map the file names, folder names, or full path names to the locations at which the storage items are stored. As an example and not by way of limitation, a storage item's location may be specified by the name, address, or identity of the FSVM that provides access to the storage item on the host machine on which the storage item is located. A storage item such as a file may be divided into multiple parts that may be located on different FSVMs, in which case access requests for a particular portion of the file may be automatically mapped to the location of the portion of the file based on the portion of the file being accessed (e.g., the offset from the beginning of the file and the number of bytes being accessed).

In particular embodiments, VFS 432 determines the location, e.g., FSVM, at which to store a storage item when the storage item is created. For example, a FSVM 404 may attempt to create a file or folder using a CVM 436 on the same host machine 402 as the user VM 418 that requested creation of the file, so that the CVM 436 that controls access operations to the file folder is co-located with the user VM 418. In this way, since the user VM 418 is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM on the same host machine as the FSVM, the FSVM may identify it and use it by default. If there is no local CVM on the same host machine as the FSVM, a delay may be incurred for communication between the FSVM and a CVM on a different host machine. Further, the VFS 432 may also attempt to store the file on a storage device that is local to the CVM being used to create the file, such as local storage, so that storage access operations between the CVM and local storage may use local or short-distance communication.

In particular embodiments, if a CVM is unable to store the storage item in local storage of a host machine on which an FSVM resides, e.g., because local storage does not have sufficient available free space, then the file may be stored in local storage of a different host machine. In this case, the stored file is not physically local to the host machine, but storage access operations for the file are performed by the locally-associated CVM and FSVM, and the CVM may communicate with local storage on the remote host machine using a network file sharing protocol, e.g., iSCSI, SAMBA, or the like.

In particular embodiments, if a virtual machine, such as a user VM 414, CVM 436, or FSVM 404, moves from a host machine 402 to a destination host machine 408, e.g., because of resource availability changes, and data items such as files or folders associated with the VM are not locally accessible on the destination host machine 408, then data migration may be performed for the data items associated with the moved VM to migrate them to the new host machine 408, so that they are local to the moved VM on the new host machine 408. FSVMs may detect removal and addition of CVMs (as may occur, for example, when a CVM fails or is shut down) via the iSCSI protocol or other technique, such as heartbeat messages. As another example, a FSVM may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 432 may change the location of the file by, for example, copying the file from its existing location(s), such as local storage 448 of a host machine 402, to its new location(s), such as local storage 450 of host machine 408 (and to or from other host machines, such as local storage 452 of host machine 416 if appropriate), and deleting the file from its existing location(s). Write operations on the file may be blocked or queued while the file is being copied, so that the copy is consistent. The VFS 432 may also redirect storage access requests for the file from an FSVM at the file's existing location to a FSVM at the file's new location.

In particular embodiments, VFS 432 includes at least three File Server Virtual Machines (FSVMs) 404, 412, 420 located on three respective host machines 402, 408, 416. To provide high-availability, there may be a maximum of one FSVM for a particular VFS instance VFS 432 per host machine in a cluster. If two FSVMs are detected on a single host machine, then one of the FSVMs may be moved to another host machine automatically, or the user (e.g., system administrator and/or file server manager) may be notified to move the FSVM to another host machine. The user and/or file server manager may move a FSVM to another host machine using an administrative interface that provides commands for starting, stopping, and moving FSVMs between host machines.

In particular embodiments, two FSVMs of different VFS instances may reside on the same host machine. If the host machine fails, the FSVMs on the host machine become unavailable, at least until the host machine recovers. Thus, if there is at most one FSVM for each VFS instance on each host machine, then at most one of the FSVMs may be lost per VFS per failed host machine. As an example, if more than one FSVM for a particular VFS instance were to reside on a host machine, and the VFS instance includes three host machines and three FSVMs, then loss of one host machine would result in loss of two-thirds of the FSVMs for the VFS instance, which would be more disruptive and more difficult to recover from than loss of one-third of the FSVMs for the VFS instance.

In particular embodiments, users, such as system administrators or other users of the user VMs, may expand the cluster of FSVMs by adding additional FSVMs. Each FSVM may be associated with at least one network address, such as an IP (Internet Protocol) address of the host machine on which the FSVM resides. There may be multiple clusters, and all FSVMs of a particular VFS instance are ordinarily in the same cluster. The VFS instance may be a member of a MICROSOFT ACTIVE DIRECTORY domain, which may provide authentication and other services such as name service.

Figure 5:
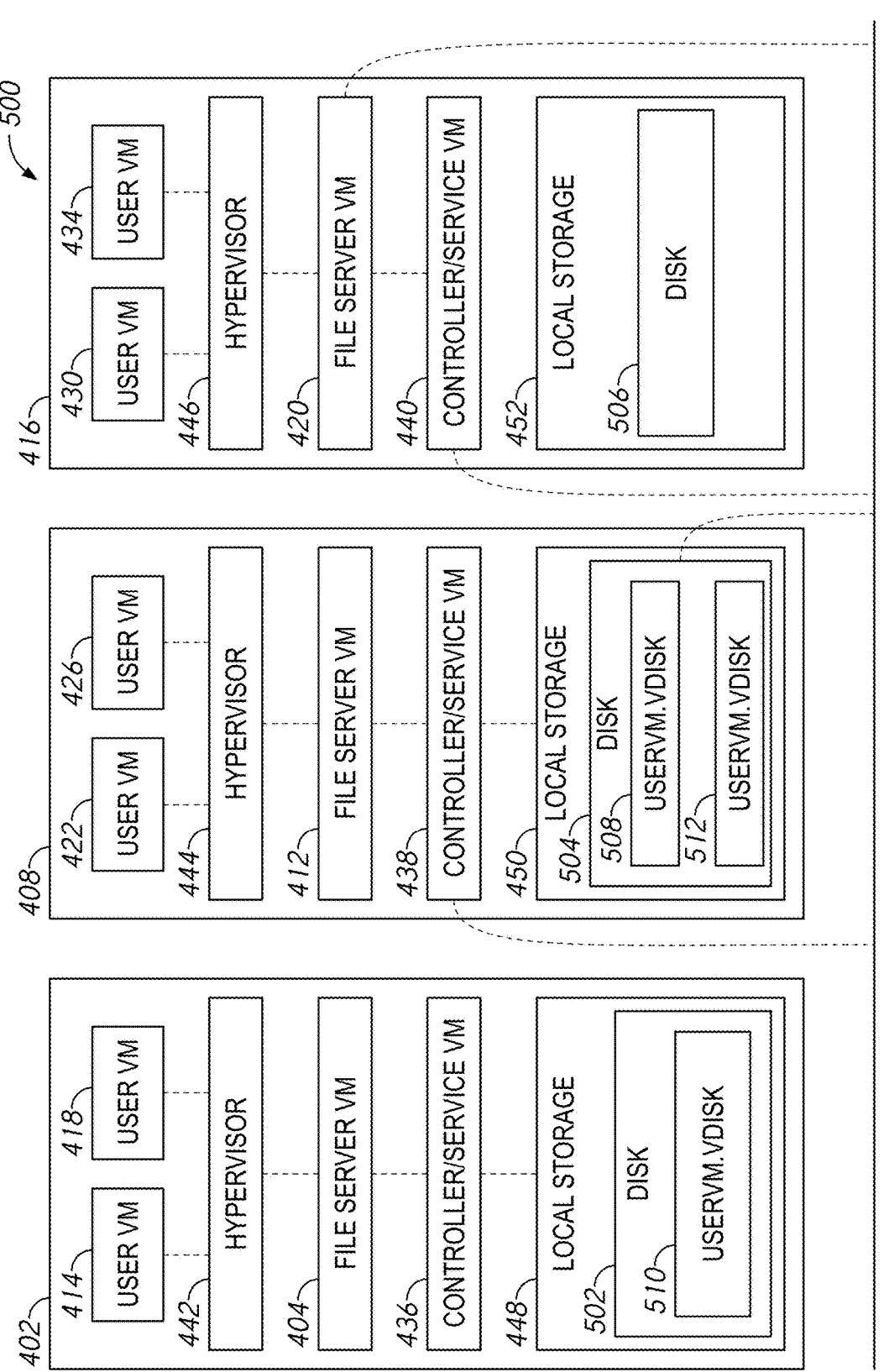
FIG. 5 is a schematic illustration of a clustered virtualization environment 500, arranged in accordance with examples described herein.

FIG. 5 illustrates data flow within a clustered virtualization environment 500 implementing a VFS instance (e.g, VFS 432) in which stored items such as files and folders used by user VMs are stored locally on the same host machines as the user VMs according to particular embodiments. As described above, one or more user VMs and a Controller/Service VM and/or hypervisor may run on each host machine along with a hypervisor. As a user VM processes I/O commands (e.g., a read or write operation), the I/O commands may be sent to the hypervisor on the same server or host machine as the user VM. For example, the hypervisor may present to the user VMs a VFS instance, receive an I/O command, and facilitate the performance of the I/O command by passing the command to a FSVM that performs the operation specified by the command. The VFS may facilitate I/O operations between a user VM and a virtualized file system. The virtualized file system may appear to the user VM as a namespace of mappable shared drives or mountable network file systems of files and directories. The namespace of the virtualized file system may be implemented using storage devices in the local storage, such as disks, onto which the shared drives or network file systems, files, and folders, or portions thereof, may be distributed as determined by the FSVMs. The VFS may thus provide features disclosed herein, such as efficient use of the disks, high availability, scalability, and others. The implementation of these features may be transparent to the user VMs. The FSVMs may present the storage capacity of the disks of the host machines as an efficient, highly-available, and scalable namespace in which the user VMs may create and access shares, files, folders, and the like.

As an example, a network share may be presented to a user VM as one or more discrete virtual disks, but each virtual disk may correspond to any part of one or more virtual or physical disks within a storage pool. Additionally or alternatively, the FSVMs may present a VFS either to the hypervisor or to user VMs of a host machine to facilitate I/O operations. The FSVMs may access the local storage via Controller/Service VMs, other storage controllers, hypervisors, or other components of the host machine. As described herein, a CVM 436 may have the ability to perform I/O operations using local storage 448 within the same host machine 402 by connecting via the network 454 to cloud storage or NAS, or by connecting via the network 454 to 450, 452 within another host machine 408, 416 (e.g., by connecting to another CVM 438, 440).

In particular embodiments, each user VM may access one or more virtual disk images stored on one or more disks of the local storage, the cloud storage, and/or the NAS. The virtual disk images may contain data used by the user VMs, such as operating system images, application software, and user data, e.g., user home folders and user profile folders. For example, FIG. 5 illustrates three virtual machine images 510, 508, 512. The virtual machine image 510 may be a file named UserVM.vmdisk (or the like) stored on disk 502 of local storage 448 of host machine 402. The virtual machine image 510 may store the contents of the user VM 414's hard drive. The disk 502 on which the virtual machine image 510 is "local to" the user VM 414 on host machine 402 because the disk 502 is in local storage 448 of the host machine 402 on which the user VM 414 is located. Thus, the user VM 414 may use local (intra-host machine) communication to access the virtual machine image 510 more efficiently, e.g., with less latency and higher throughput, than would be the case if the virtual machine image 510 were stored on disk 504 of local storage 450 of a different host machine 408, because inter-host machine communication across the network 454 would be used in the latter case. Similarly, a virtual machine image 508, which may be a file named UserVM.vmdisk (or the like), is stored on disk 504 of local storage 450 of host machine 408, and the image 508 is local to the user VM 422 located on host machine 408. Thus, the user VM 422 may access the virtual machine image 508 more efficiently than the virtual machine 418 on host machine 402, for example. In another example, the CVM 440 may be located on the same host machine 416 as the user VM 430 that accesses a virtual machine image 512 (UserVM.vmdisk) of the user VM 430, with the virtual machine image file 512 being stored on a different host machine 408 than the user VM 430 and the CVM 440. In this example, communication between the user VM 430 and the CVM 440 may still be local, e.g., more efficient than communication between the user VM 430 and a CVM 438 on a different host machine 408, but communication between the CVM 440 and the disk 504 on which the virtual machine image 512 is stored is via the network 454, as shown by the dashed lines between CVM 440 and the network 454 and between the network 454 and local storage 450. The communication between CVM 440 and the disk 504 is not local, and thus may be less efficient than local communication such as may occur between the CVM 440 and a disk 506 in local storage 452 of host machine 416. Further, a user VM 430 on host machine 416 may access data such as the virtual disk image 512 stored on a remote (e.g., non-local) disk 504 via network communication with a CVM 438 located on the remote host machine 408. This case may occur if CVM 440 is not present on host machine 416, e.g., because CVM 440 has failed, or if the FSVM 420 has been configured to communicate with 450 on host machine 408 via the CVM 438 on host machine 408, e.g., to reduce computational load on host machine 416.

In particular embodiments, since local communication is expected to be more efficient than remote communication, the FSVMs may store storage items, such as files or folders, e.g., the virtual disk images, as block-level data on local storage of the host machine on which the user VM that is expected to access the files is located. A user VM may be expected to access particular storage items if, for example, the storage items are associated with the user VM, such as by configuration information. For example, the virtual disk image 510 may be associated with the user VM 414 by configuration information of the user VM 414. Storage items may also be associated with a user VM via the identity of a user of the user VM. For example, files and folders owned by the same user ID as the user who is logged into the user VM 414 may be associated with the user VM 414. If the storage items expected to be accessed by a user VM 414 are not stored on the same host machine 402 as the user VM 414, e.g., because of insufficient available storage capacity in local storage 448 of the host machine 402, or because the storage items are expected to be accessed to a greater degree (e.g., more frequently or by more users) by a user VM 422 on a different host machine 408, then the user VM 414 may still communicate with a local CVM 436 to access the storage items located on the remote host machine 408, and the local CVM 436 may communicate with local storage 450 on the remote host machine 408 to access the storage items located on the remote host machine 408. If the user VM 414 on a host machine 402 does not or cannot use a local CVM 436 to access the storage items located on the remote host machine 408, e.g., because the local CVM 436 has crashed or the user VM 414 has been configured to use a remote CVM 438, then communication between the user VM 414 and local storage 450 on which the storage items are stored may be via a remote CVM 438 using the network 454, and the remote CVM 438 may access local storage 450 using local communication on host machine 408. As another example, a user VM 414 on a host machine 402 may access storage items located on a disk 506 of local storage 452 on another host machine 416 via a CVM 438 on an intermediary host machine 408 using network communication between the host machines 402 and 408 and between the host machines 408 and 416.

Figure 6:
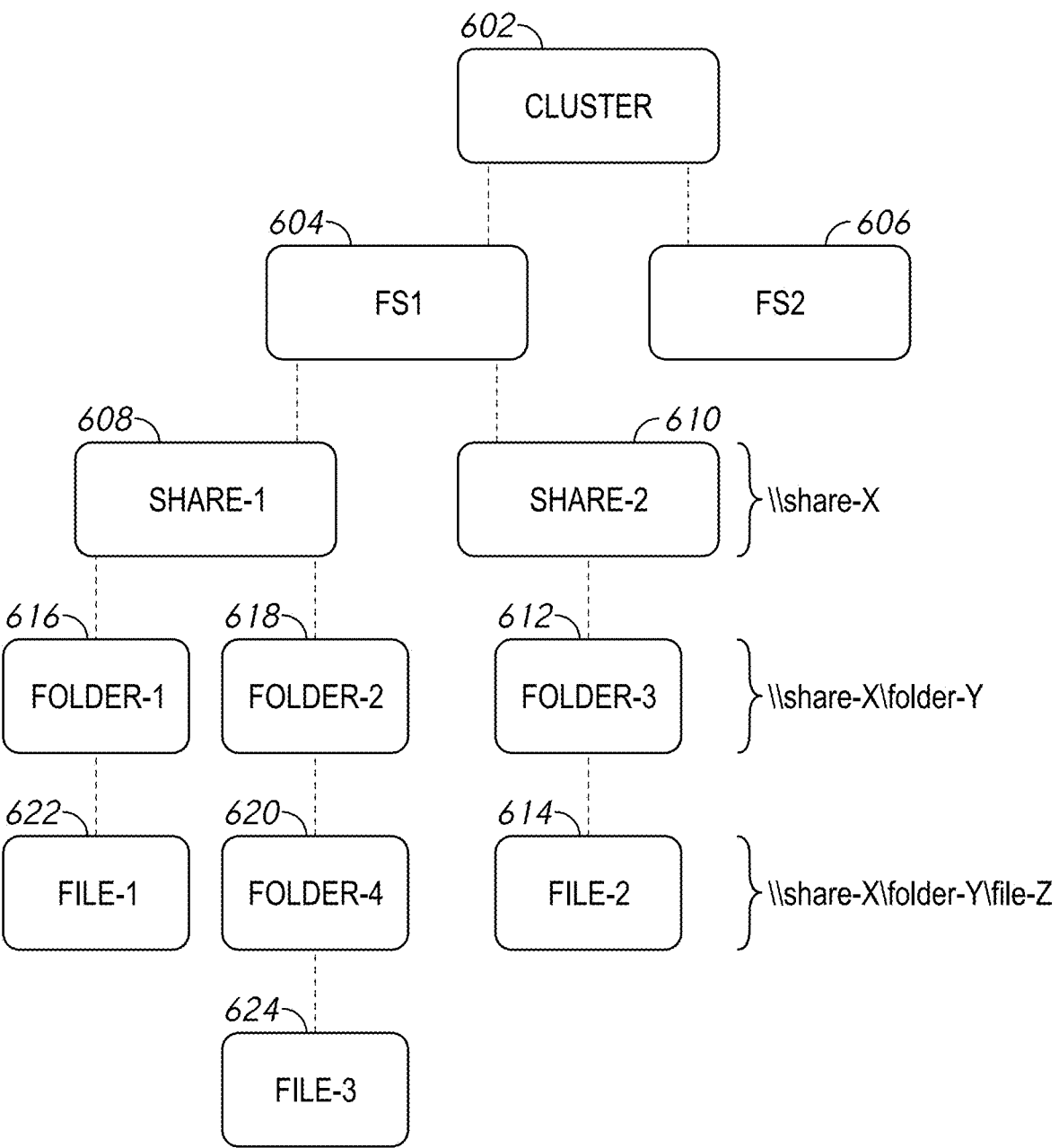
FIG. 6 illustrates an example hierarchical structure of a virtual file server (VFS) instance in a cluster, arranged in accordance with examples described herein.

FIG. 6 illustrates an example hierarchical structure of a VFS instance (e.g., a file system) in a cluster (such as a virtualized file server) according to particular embodiments. A Cluster 602 contains two VFS instances, FS1 604 and FS2 606. For example, the 602 may be used to implement and/or may be implemented by a virtualized file server described herein, such as virtualized file server 202 and/or virtualized file server 210 of FIG. 2. Each VFS instance as shown in FIG. 6 may be identified by a name such as "\\instance", e.g., "\\FS1" for WINDOWS file systems, or a name such as "instance", e.g., "FS1" for UNIX-type file systems. The VFS instance FS1 604 contains shares, including Share-1 608 and Share-2 610. Shares may have names such as "Users" for a share that stores user home directories, or the like. Each share may have a path name such as \\FS1\Share-1 or \FS1\Users. As an example and not by way of limitation, a share may correspond to a disk partition or a pool of file system blocks on WINDOWS and UNIX-type file systems. As another example and not by way of limitation, a share may correspond to a folder or directory on a VFS instance. Shares may appear in the file system instance as folders or directories to users of user VMs. Share-1 608 includes two folders, Folder-1 616, and Folder-2 618, and may also include one or more files (e.g., files not in folders). Each folder 616, 618 may include one or more files 622, 624. Share-2 610 includes a folder Folder-3 612, which includes a file File-2 614. Each folder has a folder name such as "Folder-1", "Users", or "Sam" and a path name such as "\\FS1\Share-1\Folder-1" (WINDOWS) or "share-1:/fs1/Users/Sam" (UNIX). Similarly, each file has a file name such as "File-1" or "Forecast.xls" and a path name such as "\\FS1\Share-1\Folder-1\File-1" or "share-1:/fs1/Users/Sam/Forecast.xls".

Figure 7:
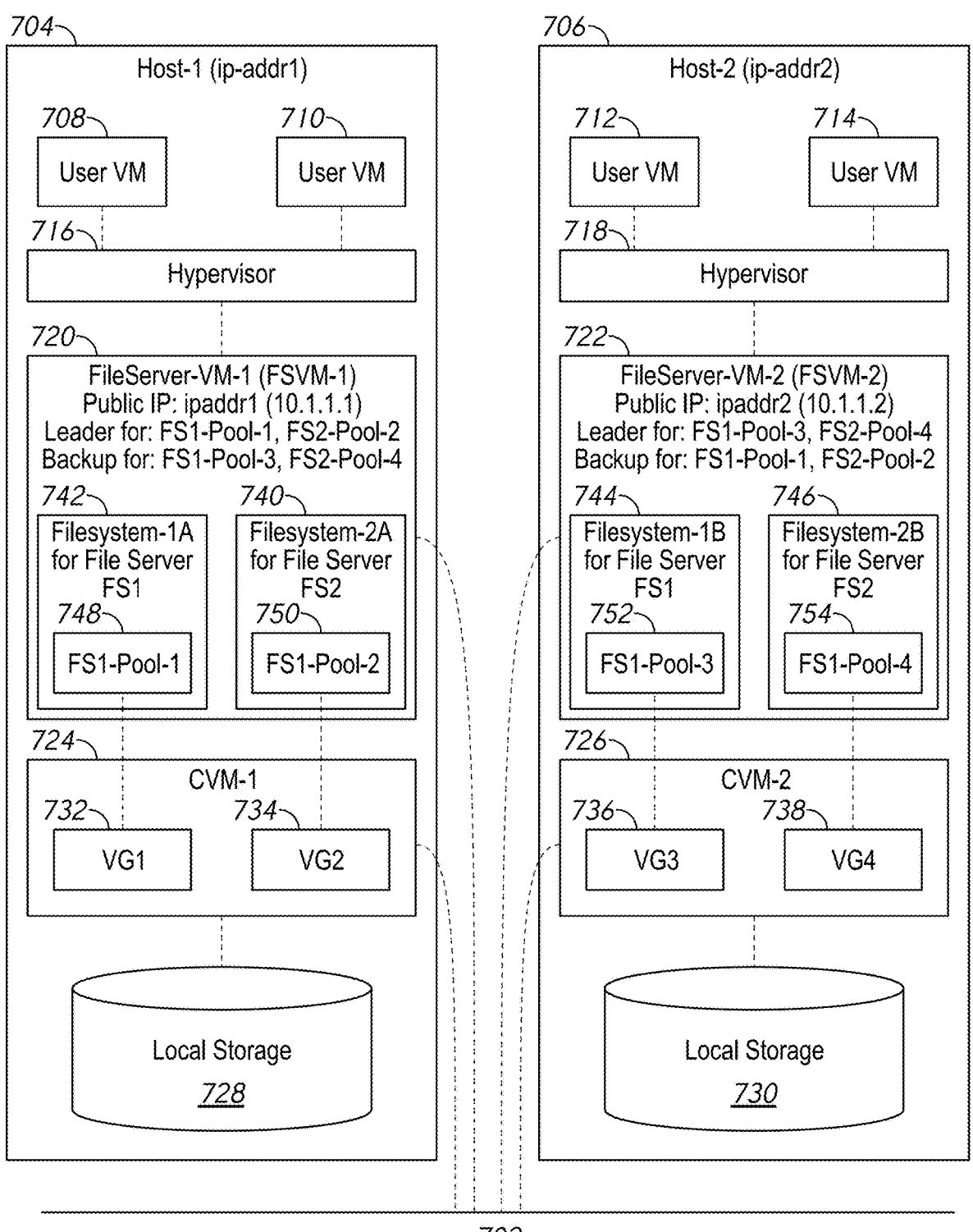
FIG. 7 illustrates two example host machines, each providing file storage services for portions of two VFS instances FS1 and FS2, arranged in accordance with examples described herein.

FIG. 7 illustrates two example host machines 704 and 706, each providing file storage services for portions of two VFS instances FS1 and FS2 according to particular embodiments. The first host machine, Host-1 402, includes two user VMs 708, 710, a Hypervisor 716, a FSVM named File-Server-VM-1 (abbreviated FSVM-1) 720, a Controller/Service VM named CVM-1 724, and local storage 728. Host-1's FileServer-VM-1 720 has an IP (Internet Protocol) network address of 10.1.1.1, which is an address of a network interface on Host-1 704. Host-1 has a hostname ip-addr1, which may correspond to Host-1's IP address 10.1.1.1. The second host machine, Host-2 706, includes two user VMs 712, 714, a Hypervisor 718, a File Server VM named FileServer-VM-2 (abbreviated FSVM-2) 722, a Controller/Service VM named CVM-2 726, and local storage 730. Host-2's FileServer-VM-2 722 has an IP network address of 10.1.1.2, which is an address of a network interface on Host-2 706.

In particular embodiments, file systems FileSystem-1A 742 and FileSystem-2A 740 implement the structure of files and folders for portions of the FS1 and FS2 file server instances, respectively, that are located on (e.g., served by) FileServer-VM-1 720 on Host-1 704. Other file systems on other host machines may implement other portions of the FS1 and FS2 file server instances. The file systems 742 and 740 may implement the structure of at least a portion of a file server instance by translating file system operations, such as opening a file, writing data to or reading data from the file, deleting a file, and so on, to disk I/O operations such as seeking to a portion of the disk, reading or writing an index of file information, writing data to or reading data from blocks of the disk, allocating or de-allocating the blocks, and so on. The file systems 742, 740 may thus store their file system data, including the structure of the folder and file hierarchy, the names of the storage items (e.g., folders and files), and the contents of the storage items on one or more storage devices, such as local storage 728. The particular storage device or devices on which the file system data for each file system are stored may be specified by an associated file system pool (e.g., 748 and 750). For example, the storage device(s) on which data for FileSystem-1A 742 and FileSystem-2A, 740 are stored may be specified by respective file system pools FS1-Pool-1 748 and FS2-Pool-2 750. The storage devices for the pool may be selected from volume groups provided by CVM-1 724, such as volume group VG1 732 and volume group VG2 734. Each volume group 732, 734 may include a group of one or more available storage devices that are present in local storage 728 associated with (e.g., by iSCSI communication) the CVM-1 724. The CVM-1 724 may be associated with a local storage 728 on the same host machine 402 as the CVM-1 724, or with a local storage 730 on a different host machine 706. The CVM-1 724 may also be associated with other types of storage, such as cloud storage, networked storage or the like. Although the examples described herein include particular host machines, virtual machines, file servers, file server instances, file server pools, CVMs, volume groups, and associations there between, any number of host machines, virtual machines, file servers, file server instances, file server pools, CVMs, volume groups, and any associations there between are possible and contemplated.

In particular embodiments, the file system pool 748 may associate any storage device in one of the volume groups 732, 734 of storage devices that are available in local storage 728 with the file system FileSystem-1A 742. For example, the file system pool FS1-Pool-1 748 may specify that a disk device named hd1 in the volume group VG1 732 of local storage 728 is a storage device for FileSystem-1A 742 for file server FS1 on FSVM-1 720. A file system pool FS2-Pool-2 750 may specify a storage device FileSystem-2A 750 for file server FS2 on FSVM-1 720. The storage device for FileSystem-2A 740 may be, e.g., the disk device hd1, or a different device in one of the volume groups 732, 734, such as a disk device named hd2 in volume group VG2 734. Each of the file systems FileSystem-1A 742, FileSystem-2A 740 may be, e.g., an instance of the NTFS file system used by the WINDOWS operating system, of the UFS Unix file system, or the like. The term "file system" may also be used herein to refer to an instance of a type of file system, e.g., a particular structure of folders and files with particular names and content.

In one example, referring to FIG. 6 and FIG. 7, an FS1 hierarchy rooted at File Server FS1 604 may be located on FileServer-VM-1 720 and stored in file system instance FileSystem-1A 742. That is, the file system instance File- System-1A 742 may store the names of the shares and storage items (such as folders and files), as well as the contents of the storage items, shown in the hierarchy at and below File Server FS1 604. A portion of the FS1 hierarchy shown in FIG. 6, such the portion rooted at Folder-2 618, may be located on FileServer-VM-2 722 on Host-2 706 instead of FileServer-VM-1 720, in which case the file system instance FileSystem-1B 744 may store the portion of the FS1 hierarchy rooted at Folder-2 618, including Folder-3 612, Folder-4 620 and File-3 624. Similarly, an FS2 hierarchy rooted at File Server FS2 606 in FIG. 6 may be located on FileServer-VM-1 720 and stored in file system instance FileSystem-2A 740. The FS2 hierarchy may be split into multiple portions (not shown), such that one portion is located on FileServer-VM-1 720 on Host-1 704, and another portion is located on FileServer-VM-2 722 on Host-2 706 and stored in file system instance FileSystem-2B 746.

In particular embodiments, FileServer-VM-1 (abbreviated FSVM-1) 720 on Host-1 704 is a leader for a portion of file server instance FS1 and a portion of FS2, and is a backup for another portion of FS1 and another portion of FS2. The portion of FS1 for which FileServer-VM-1 720 is a leader corresponds to a storage pool labeled FS1-Pool-1 748. FileServer-VM-1 is also a leader for FS2-Pool-2 750, and is a backup (e.g., is prepared to become a leader upon request, such as in response to a failure of another FSVM) for FS1-Pool-3 752 and FS2-Pool-4 754 on Host-2 706. In particular embodiments, FileServer-VM-2 (abbreviated FSVM-2) 722 is a leader for a portion of file server instance FS1 and a portion of FS2, and is a backup for another portion of FS1 and another portion of FS2. The portion of FS1 for which FSVM-2 722 is a leader corresponds to a storage pool labeled FS1-Pool-3 752. FSVM-2 722 is also a leader for FS2-Pool-4 754, and is a backup for FS1-Pool-1 748 and FS2-Pool-2 750 on Host-1 704.

In particular embodiments, the file server instances FS1, FS2 provided by the FSVMs 720 and 722 may be accessed by user VMs 708, 710, 712 and 714 via a network file system protocol such as SMB, CIFS, NFS, or the like. Each FSVM 720 and 722 may provide what appears to client applications on user VMs 708, 710, 712 and 714 to be a single file system instance, e.g., a single namespace of shares, files and folders, for each file server instance. However, the shares, files, and folders in a file server instance such as FS1 may actually be distributed across multiple FSVMs 720 and 722. For example, different folders in the same file server instance may be associated with different corresponding FSVMs 720 and 722 and CVMs 724 and 726 on different host machines 704 and 706.

The example file server instance FS1 604 shown in FIG. 6 has two shares, Share-1 608 and Share-2 610. Share-1 608 may be located on FSVM-1 720, CVM-1 724, and local storage 728. Network file system protocol requests from user VMs to read or write data on file server instance FS1 604 and any share, folder, or file in the instance may be sent to FSVM-1 720. FSVM-1 720 (or another component, such as a hypervisor in some examples) may determine whether the requested data, e.g., the share, folder, file, or a portion thereof, referenced in the request, is located on FSVM-1, and FSVM-1 is a leader for the requested data. If not, FSVM-1 may respond to the requesting User-VM with an indication that the requested data is not covered by (e.g., is not located on or served by) FSVM-1. Otherwise, the requested data is covered by (e.g., is located on or served by) FSVM-1, so FSVM-1 may send iSCSI protocol requests to a CVM that is associated with the requested data. Note that the CVM associated with the requested data may be the CVM-1 724 on the same host machine 402 as the FSVM-1, or a different CVM on a different host machine 706, depending on the configuration of the VFS. In this example, the requested Share-1 is located on FSVM-1, so FSVM-1 processes the request. To provide for path availability, multipath I/O (MPIO) may be used for communication with the FSVM, e.g., for communication between FSVM-1 and CVM-1. The active path may be set to the CVM that is local to the FSVM (e.g., on the same host machine) by default. The active path may be set to a remote CVM instead of the local CVM, e.g., when a failover occurs.

Continuing with the data request example, the associated CVM is CVM 724, which may in turn access the storage device associated with the requested data as specified in the request, e.g., to write specified data to the storage device or read requested data from a specified location on the storage device. In this example, the associated storage device is in local storage 728, and may be an HDD or SSD. CVM-1 724 may access the HDD or SSD via an appropriate protocol, e.g., iSCSI, SCSI, SATA, or the like. CVM 110a may send the results of accessing local storage 728, e.g., data that has been read, or the status of a data write operation, to CVM 724 via, e.g., SATA, which may in turn send the results to FSVM-1 720 via, e.g., iSCSI. FSVM-1 720 may then send the results to user VM via SMB through the Hypervisor 716.

Share-2 610 may be located on FSVM-2 722, on Host-2. Network file service protocol requests from user VMs to read or write data on Share-2 may be directed to FSVM-2 722 on Host-2 by other FSVMs. Alternatively, user VMs may send such requests directly to FSVM-2 722 on Host-2, which may process the requests using CVM-2 726 and local storage 730 on Host-2 as described above for FSVM-1 720 on Host-1.

A file server instance such as FS1 604 in FIG. 6 may appear as a single file system instance (e.g., a single namespace of folders and files that are accessible by their names or pathnames without regard for their physical locations), even though portions of the file system are stored on different host machines. Since each FSVM may provide a portion of a file server instance, each FSVM may have one or more "local" file systems that provide the portion of the file server instance (e.g., the portion of the namespace of files and folders) associated with the FSVM.

Figure 8:
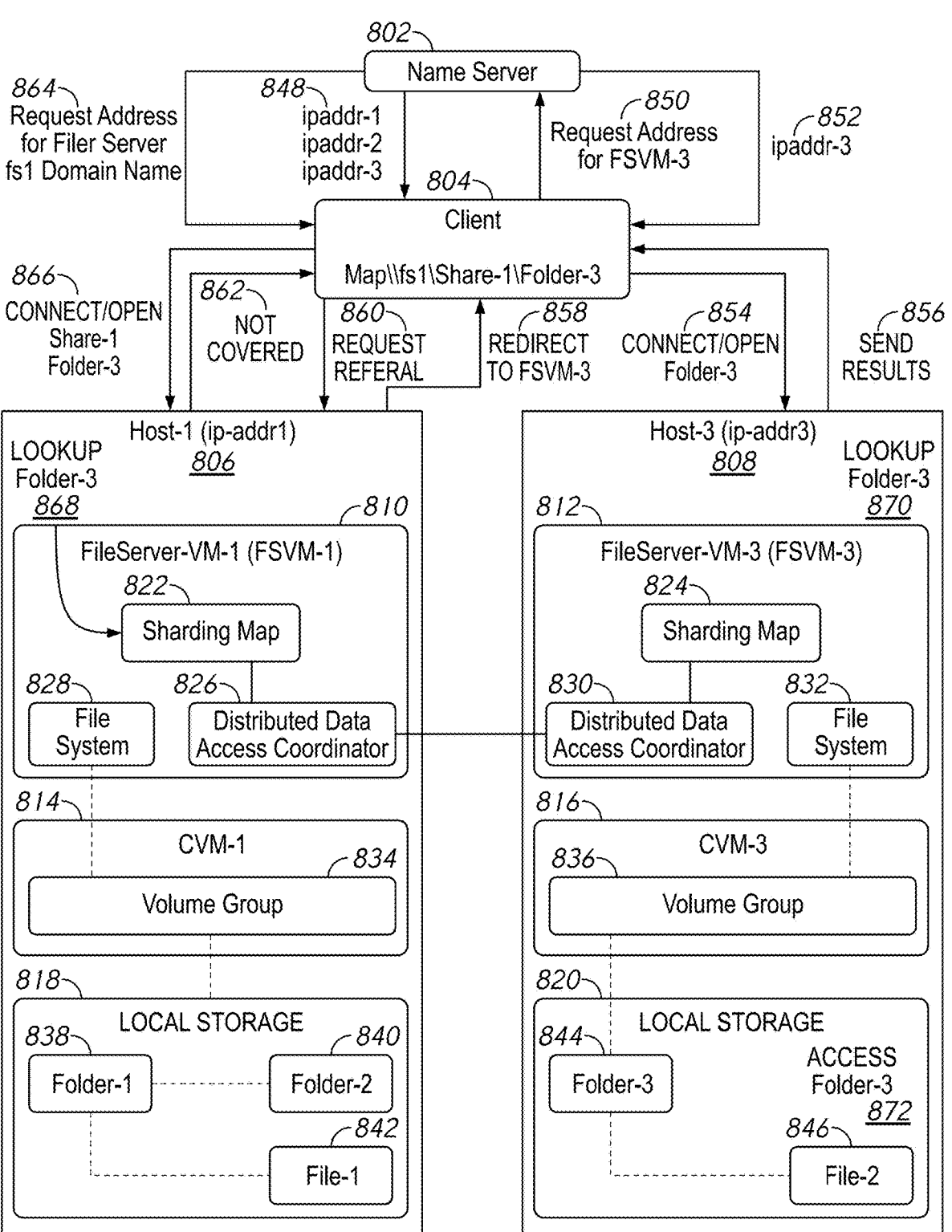
FIG. 8 illustrates example interactions between a client and host machines on which different portions of a VFS instance are stored, arranged in accordance with examples described herein.

FIG. 8 illustrates example interactions between a client 804 and host machines 806 and 808 on which different portions of a VFS instance are stored according to particular embodiments. A client 804, e.g., an application program executing in one of the user VMs and on the host machines of a virtualized file server described herein requests access to a folder \\FS1.domain.name\Share-1\Folder-3. The request may be in response to an attempt to map \\FS1.domain.name\Share-1 to a network drive in the operating system executing in the user VM followed by an attempt to access the contents of Share-1 or to access the contents of Folder-3, such as listing the files in Folder-3.

FIG. 8 shows interactions that occur between the client 804, FSVMs 810 and 812 on host machines 806 and 808, and a name server 802 when a storage item is mapped or otherwise accessed. The name server 802 may be provided by a server computer system, such as one or more of the host machines 806, 808 or a server computer system separate from the host machines 806, 808. In one example, the name server 802 may be provided by an ACTIVE DIRECTORY service executing on one or more computer systems and accessible via the network. The interactions are shown as arrows that represent communications, e.g., messages sent via the network. Note that the client 804 may be executing in a user VM, which may be co-located with one of the FSVMs 810 and 812. In such a co-located case, the arrows between the client 804 and the host machine on which the FSVM is located may represent communication within the host machine, and such intra-host machine communication may be performed using a mechanism different from communication over the network, e.g., shared memory or inter process communication.

In particular embodiments, when the client 804 requests access to Folder-3, a VFS client component executing in the user VM may use a distributed file system protocol such as MICROSOFT DFS, or the like, to send the storage access request to one or more of the FSVMs of FIGS. 3-4. To access the requested file or folder, the client determines the location of the requested file or folder, e.g., the identity and/or network address of the FSVM on which the file or folder is located. The client may query a domain cache of FSVM network addresses that the client has previously identified (e.g., looked up). If the domain cache contains the network address of an FSVM associated with the requested folder name \\FS1.domain.name\Share-1\Folder-3, then the client retrieves the associated network address from the domain cache and sends the access request to the network address, starting at step 864 as described below.

In particular embodiments, at step 864, the client may send a request for a list of addresses of FSVMs to a name server 802. The name server 802 may be, e.g., a DNS server or other type of server, such as a MICROSOFT domain controller (not shown), that has a database of FSVM addresses. At step 848, the name server 802 may send a reply that contains a list of FSVM network addresses, e.g., ip-addr1, ip-addr2, and ip-addr3, which correspond to the FSVMs in this example. At step 866, the client 804 may send an access request to one of the network addresses, e.g., the first network address in the list (ip-addr1 in this example), requesting the contents of Folder-3 of Share-1. By selecting the first network address in the list, the particular FSVM to which the access request is sent may be varied, e.g., in a round-robin manner by enabling round-robin DNS (or the like) on the name server 802. The access request may be, e.g., an SMB connect request, an NFS open request, and/or appropriate request(s) to traverse the hierarchy of Share-1 to reach the desired folder or file, e.g., Folder-3 in this example.

At step 868, FileServer-VM-1 810 may process the request received at step 866 by searching a mapping or lookup table, such as a sharding map 822, for the desired folder or file. The map 822 maps stored objects, such as shares, folders, or files, to their corresponding locations, e.g., the names or addresses of FSVMs. The map 822 may have the same contents on each host machine, with the contents on different host machines being synchronized using a distributed data store as described below. For example, the map 822 may contain entries that map Share-1 and Folder-1 to the File Server FSVM-1 810, and Folder-3 to the File Server FSVM-3 812. An example map is shown in Table 1 below. While the example of FIG. 8 is depicted and described with respect to the FSVM processing the request, in some examples, one or more other components of a virtualized system may additionally or instead process the request (e.g., a CVM and/or a hypervisor).

| Stored Object | Location |
| --- | --- |
| Folder-1 | FSVM-1 |
| Folder-2 | FSVM-1 |
| File-1 | FSVM-1 |

-continued

| Stored Object | Location |
| --- | --- |
| Folder-3 | FSVM-3 |
| File-2 | FSVM-3 |

In particular embodiments, the map 822 or 824 may be accessible on each of the host machines. The maps may be copies of a distributed data structure that are maintained and accessed at each FSVM using a distributed data access coordinator 826 and 830. The distributed data access coordinator 826 and 830 may be implemented based on distributed locks or other storage item access operations. Alternatively, the distributed data access coordinator 826 and 830 may be implemented by maintaining a master copy of the maps 822 and 824 at a leader node such as the host machine 808, and using distributed locks to access the master copy from each FSVM 810 and 812. The distributed data access coordinator 826 and 830 may be implemented using distributed locking, leader election, or related features provided by a centralized coordination service for maintaining configuration information, naming, providing distributed synchronization, and/or providing group services (e.g., APACHE ZOOKEEPER or other distributed coordination software). Since the map 822 indicates that Folder-3 is located at FSVM-3 812 on Host-3 808, the lookup operation at step 868 determines that Folder-3 is not located at FSVM-1 on Host-1 806. Thus, at step 862 the FSVM-1 810 (or other component of the virtualized system) sends a response, e.g., a "Not Covered" DFS response, to the client 804 indicating that the requested folder is not located at FSVM-1. At step 860, the client 804 sends a request to FSVM-1 for a referral to the FSVM on which Folder-3 is located. FSVM-1 uses the map 822 to determine that Folder-3 is located at FSVM-3 on Host-3 808, and at step 858 returns a response, e.g., a "Redirect" DFS response, redirecting the client 804 to FSVM-3. The client 804 may then determine the network address for FSVM-3, which is ip-addr3 (e.g., a host name "ip-addr3.domain.name" or an IP address, 10.1.1.3). The client 804 may determine the network address for FSVM-3 by searching a cache stored in memory of the client 804, which may contain a mapping from FSVM-3 to ip-addr3 cached in a previous operation. If the cache does not contain a network address for FSVM-3, then at step 850 the client 804 may send a request to the name server 802 to resolve the name FSVM-3. The name server may respond with the resolved address, ip-addr3, at step 852. The client 804 may then store the association between FSVM-3 and ip-addr3 in the client's cache.

In particular embodiments, failure of FSVMs may be detected using the centralized coordination service. For example, using the centralized coordination service, each FSVM may create a lock on the host machine on which the FSVM is located using ephemeral nodes of the centralized coordination service (which are different from host machines but may correspond to host machines). Other FSVMs may volunteer for leadership of resources of remote FSVMs on other host machines, e.g., by requesting a lock on the other host machines. The locks requested by the other nodes are not granted unless communication to the leader host machine is lost, in which case the centralized coordination service deletes the ephemeral node and grants the lock to one of the volunteer host machines and, which becomes the new leader. For example, the volunteer host machines may be ordered by the time at which the centralized coordination service received their requests, and the lock may be granted to the first host machine on the ordered list. The first host machine on the list may thus be selected as the new leader. The FSVM on the new leader has ownership of the resources that were associated with the failed leader FSVM until the failed leader FSVM is restored, at which point the restored FSVM may reclaim the local resources of the host machine on which it is located.

At step 854, the client 804 may send an access request to FSVM-3 812 at ip-addr3 on Host-3 808 requesting the contents of Folder-3 of Share-1. At step 870, FSVM-3 812 queries FSVM-3's copy of the map 824 using FSVM-3's instance of the distributed data access coordinator 830. The map 824 indicates that Folder-3 is located on FSVM-3, so at step 872 FSVM-3 accesses the file system 832 to retrieve information about Folder-3 844 and its contents (e.g., a list of files in the folder, which includes File-2 846) that are stored on the local storage 820. FSVM-3 may access local storage 820 via CVM-3 816, which provides access to local storage 820 via a volume group 836 that contains one or more volumes stored on one or more storage devices in local storage 820. At step 856, FSVM-3 may then send the information about Folder-3 and its contents to the client 804. Optionally, FSVM-3 may retrieve the contents of File-2 and send them to the client 804, or the client 804 may send a subsequent request to retrieve File-2 as needed.

Figure 9:
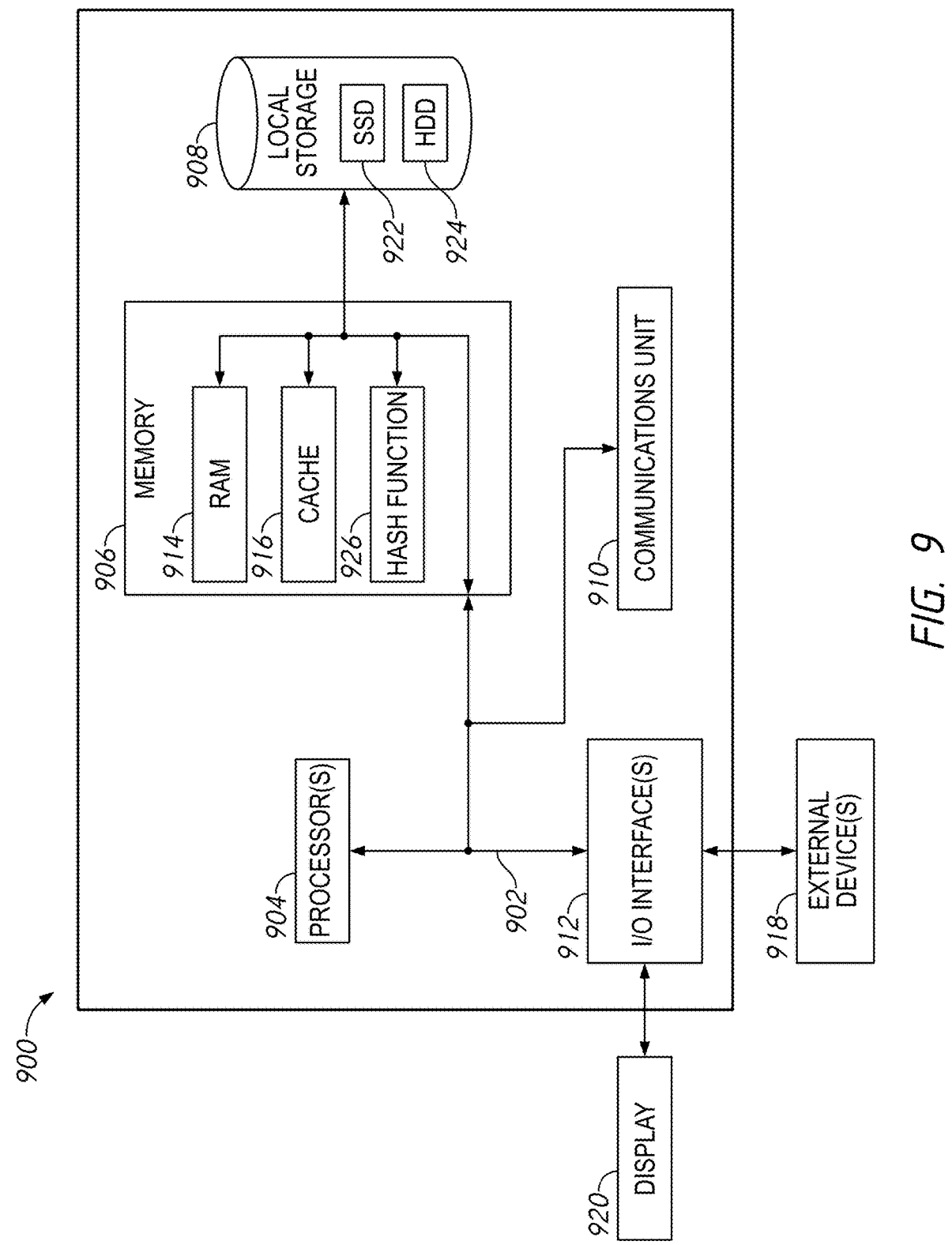
FIG. 9 is a schematic illustration of a computing system, arranged in accordance with examples described herein.

FIG. 9 depicts a block diagram of components of a computing system in accordance with examples described herein. It should be appreciated that FIG. 9 provides only an illustration of one implementation and does not imply any limitations with regard to the environments in which different embodiments may be implemented. Many modifications to the depicted environment may be made. The computing system may be used to implement and/or may be implemented by the file server manager 102 of FIG. 1 an admin system as described herein. The components shown in FIG. 9 are exemplary only, and it is to be understood that additional, fewer, and/or different components may be used in other examples.

The computing node 900 includes one or more communications fabric(s) 902, which provide communications between one or more processor(s) 904, memory 906, local storage 908, communications unit 910, and/or I/O interface(s) 912. The communications fabric(s) 902 can be implemented with any architecture designed for passing data and/or control information between processors (such as microprocessors, communications and network processors, etc.), system memory, peripheral devices, and any other hardware components within a system. For example, the communications fabric(s) 902 can be implemented with one or more buses.

The memory 906 and the local storage 908 may be computer-readable storage media. In the example of FIG. 9, the memory 906 includes random access memory RAM 914 and cache 916. In general, the memory 906 can include any suitable volatile or non-volatile computer-readable storage media. In this embodiment, the local storage 908 includes an SSD 922 and an HDD 924. The memory 906 may include executable instructions for providing a hash function 926. The instructions for providing a hash function 926 may be used to implement and/or implemented by hash function 242 and/or hash function 244 of FIG. 2. The memory 906 may include executable instructions for implementing one or more FSVMs, such as FSVM 204 and/or FSVM 212 of FIG. 2. The memory 906 may include executable instructions for providing a file server manager, such as file server manager 102 of FIG. 1.

Various computer instructions, programs, files, images, etc. may be stored in local storage 908 and/or memory 906 for execution by one or more of the respective processor(s) 904 via one or more memories of memory 906. In some examples, local storage 908 includes a magnetic HDD 924. Alternatively, or in addition to a magnetic hard disk drive, local storage 908 can include the SSD 922, a semiconductor storage device, a read-only memory (ROM), an erasable programmable read-only memory (EPROM), a flash memory, or any other computer-readable storage media that is capable of storing program instructions or digital information.

The media used by local storage 908 may also be removable. For example, a removable hard drive may be used for local storage 908. Other examples include optical and magnetic disks, thumb drives, and smart cards that are inserted into a drive for transfer onto another computer-readable storage medium that is also part of local storage 908.

Communications unit 910, in some examples, provides for communications with other data processing systems or devices. For example, communications unit 910 may include one or more network interface cards. Communications unit 910 may provide communications through the use of either or both physical and wireless communications links.

I/O interface(s) 912 may allow for input and output of data with other devices that may be connected to computing node 900. For example, I/O interface(s) 912 may provide a connection to external device(s) 918 such as a keyboard, a keypad, a touch screen, and/or some other suitable input device. External device(s) 918 can also include portable computer-readable storage media such as, for example, thumb drives, portable optical or magnetic disks, and memory cards. Software and data used to practice embodiments of the present invention can be stored on such portable computer-readable storage media and can be loaded onto and/or encoded in memory 906 and/or local storage 908 via I/O interface(s) 912 in some examples. I/O interface(s) 912 may connect to a display 920. Display 920 may provide a mechanism to display data to a user and may be, for example, a computer monitor.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A method comprising:
registering a user at a first file server of a plurality of file servers, wherein the registering comprises generating a first local user system identification (SID) and a global ID for the user;
migrating data, including a file and an associated access control list (ACL), from the first file server to a second file server of the plurality of file servers;
registering the user at the second file server, wherein the registering comprises generating a second local user SID and the global ID for the user; and providing access to the file at the second file server to the user, based at least on the global ID.

2. The method of claim 1, wherein generating the first local user SID is based at least on the first file server.

3. The method of claim 1, wherein generating the second local user SID is based at least on the second file server.

4. The method of claim 1, wherein the global ID generated for the user at the first file server is the same global ID generated for the user at the second file server.

5. The method of claim 1, wherein generating the global ID at the first file server, the second file server, or a combination thereof, is based at least on a hash function using one or more attributes associated with the user.

6. The method of claim 1, wherein the first file server comprises a first cluster of computing nodes configured to provide a distributed file system and the second file server comprises a second cluster of computing nodes, different from the first cluster of computing nodes, the second cluster of computing nodes also configured to provide the distributed file system.

7. The method of claim 1, wherein the first file server comprises a first cluster of computing nodes, and wherein each node of the first cluster of computing nodes comprises one or more file server virtual machines (FSVMs).

8. The method of claim 7, wherein the one or more FSVMs are configured to form a single namespace of storage items distributed across a storage pool, and wherein the storage pool includes local storage devices of the first cluster of computing nodes.

9. The method of claim 1, the method further comprising:
storing the global ID generated at the first file server in metadata associated with the ACL for the file, wherein the file and the ACL are accessible through the first file server.

10. The method of claim 9 the method further comprising:
receiving an access request by the user to access the file at the second file server; and
translating the second local user SID for the user into the global ID.

11. The method of claim 10, the method further comprising:
matching the global ID to the ACL to determine access to the file for the user at the second file server.

12. A system comprising:
a first file server comprising a first cluster of computing nodes and configured to provide a distributed file system, and a second file server comprising a second cluster of computing nodes different from the first cluster of computing nodes and configured to provide the distributed file system, wherein the first file server is further configured to:
generate, for a user of the first file server, a first local user system identification (SID),
generate, for the user, a global ID based on one or more attributes associated with the user, and
store the global ID fort the user in metadata associated with an access control list (ACL) for a file accessible through the first file server; and
wherein the second file server is further configured to:
receive data migrated from the first file server, the data comprising the file and the ACL,
generate, for the user, a second local user SID,
generate, for the user, the global ID based on the one or more attributes associated with the user, and
based on receiving an access request associated with the user based on the second local user SID, translating the second local user SID for the user into the global ID, wherein access to the file is determined based at least on the global ID.

13. The system of claim 12, wherein the global ID generated for the user at the first file server is the same global ID generated for the user at the second file server.

14. The system of claim 12, wherein access to the file is further determined based at least on matching the global ID translated from the second local user ID to the ACL.

15. The system of claim 12, wherein generating the global ID is further based on a hash function using the one or more attributes associated with the user.

16. The system of claim 12, wherein generating the first local user SID is based at least on the first file server.

17. The system of claim 12, wherein generating the second local user SID is based at least on the second file server.

18. The system of claim 12, wherein the first file server is a source file server and the second file server is a destination file server.

19. The system of claim 12, wherein each node of the first cluster of computing nodes comprises one or more file server virtual machines (FSVMs).

20. The system of claim 19, wherein the one or more FSVMs are configured to form a single namespace of storage items distributed across a storage pool, and wherein the storage pool includes local storage devices of the first cluster of computing nodes.

21. At least one non-transitory computer readable media encoded with instructions which, when executed, cause a system to perform actions comprising:
registering a user at a first file server of a plurality of file servers, wherein the registering comprises generating a first local user system identification (SID) and a global ID for the user;
migrating data, including a file and an associated access control list (ACL), from the first file server to a second file server of the plurality of file servers;
registering the user at the second file server, wherein the registering comprises generating a second local user SID and the global ID for the user; and
providing access to the file at the second file server to the user, based at least on the global ID.

22. The at least one non-transitory computer readable media of claim 21, wherein generating the first local user SID is based at least on the first file server.

23. The at least one non-transitory computer readable media of claim 21, wherein generating the second local user SID is based at least on the second file server.

24. The at least one non-transitory computer readable media of claim 21, wherein the global ID generated for the user at the first file server is the same global ID generated for the user at the second file server.

25. The at least one non-transitory computer readable media of claim 21, wherein generating the global ID at the first file server, the second file server, or a combination thereof, is based at least on a hash function using one or more attributes associated with the user.

26. The at least one non-transitory computer readable media of claim 21, wherein the first file server comprises a first cluster of computing nodes configured to provide a distributed file system and the second file server comprises a second cluster of computing nodes, different from the first cluster of computing nodes, the second cluster of computing nodes also configured to provide the distributed file system.

27. The at least one non-transitory computer readable media of claim 21, wherein the first file server comprises a first cluster of computing nodes, and wherein each node of the first cluster of computing nodes comprises one or more file server virtual machines (FSVMs).

28. The at least one non-transitory computer readable media of claim 27, wherein the one or more FSVMs are configured to form a single namespace of storage items distributed across a storage pool, and wherein the storage pool includes local storage devices of the first cluster of computing nodes.

29. The at least one non-transitory computer readable media of claim 21, wherein the instructions, when executed, cause the system to perform actions further comprising:

storing the global ID generated at the first file server in metadata associated with the ACL for the file, wherein the file and the ACL are accessible through the first file server.

30. The at least one non-transitory computer readable media of claim 29, wherein the instructions, when executed, cause the system to perform actions further comprising:

receiving an access request by the user to access the file at the second file server; and translating the second local user SID for the user into the global ID.

31. The at least one non-transitory computer readable media of claim 30, wherein the instructions, when executed, cause the system to perform actions further comprising:

matching the global ID to the ACL to determine access to the file for the user at the second file server.

* * * * *